(12) United States Patent
Chao et al.

(10) Patent No.: US 7,792,118 B2
(45) Date of Patent: Sep. 7, 2010

(54) SWITCH MODULE MEMORY STRUCTURE AND PER-DESTINATION QUEUE FLOW CONTROL FOR USE IN A SWITCH

(75) Inventors: Hung-Hsiang Jonathan Chao, Holmdel, NJ (US); Jinsoo Park, Leonia, NJ (US)

(73) Assignee: Polytechnic University, Brooklyn, NY (US)

( * ) Notice: Subject to any disclaimer, the term of this patent is extended or adjusted under 35 U.S.C. 154(b) by 1280 days.

(21) Appl. No.: 10/776,575

(22) Filed: Feb. 11, 2004

(65) Prior Publication Data

US 2005/0002410 A1     Jan. 6, 2005

Related U.S. Application Data

(60) Provisional application No. 60/479,733, filed on Jun. 19, 2003.

(51) Int. Cl.
*H04L 12/28* (2006.01)
(52) U.S. Cl. .................... 370/395.1; 370/412; 370/413; 370/417; 370/386; 370/428
(58) Field of Classification Search ................ 370/412, 370/413, 417, 386, 428, 395.1; 710/57
See application file for complete search history.

(56) References Cited

U.S. PATENT DOCUMENTS

| | | | |
|---|---|---|---|
| 5,179,556 A | 1/1993 | Turner | |
| 5,600,795 A | 2/1997 | Du | 709/227 |
| 5,689,506 A | 11/1997 | Chiussi et al. | 370/388 |
| 5,864,539 A | 1/1999 | Yin | 370/236 |
| 6,072,772 A | 6/2000 | Charny et al. | |
| 6,310,879 B2 | 10/2001 | Zhou et al. | |
| 6,333,932 B1 | 12/2001 | Kobayasi et al. | 370/389 |
| 6,396,815 B1 | 5/2002 | Greaves et al. | 370/256 |
| 6,426,957 B1 | 7/2002 | Hauser et al. | 370/413 |
| 6,449,275 B1 | 9/2002 | Andersson et al. | 370/395.1 |
| 6,463,485 B1 * | 10/2002 | Chui et al. | 710/52 |
| 6,504,820 B1 | 1/2003 | Oliva | 370/232 |
| 6,621,824 B1 | 9/2003 | Lauffenburger et al. | 370/412 |
| 6,628,657 B1 | 9/2003 | Manchester et al. | 370/395.1 |
| 6,631,130 B1 | 10/2003 | Roy et al. | 370/352 |
| 6,819,675 B2 * | 11/2004 | Benayoun et al. | 370/412 |
| 6,870,831 B2 | 3/2005 | Hughes et al. | 370/352 |

(Continued)

OTHER PUBLICATIONS

Cooperatve Association for Internet Data Analysis, www.CAIDA.org, downloaded 2008, 1 page.

(Continued)

*Primary Examiner*—Duc C Ho
(74) *Attorney, Agent, or Firm*—Woodcock Washburn LLP

(57) ABSTRACT

To use the memory space more effectively, cell memory can be shared by an input link and all output links. To prevent one flow from occupying the entire memory space, a threshold may be provided for the queue. The queue threshold may accommodate the RTT delay of the link. Queue length information about a downstream switch module may be sent to an upstream switch module via cell headers in every credit update period per link. Cell and/or credit loss may be recovered from. Increasing the credit update period reduces the cell header bandwidth but doesn't degrade performance significantly. Sending a credit per link simplifies implementation and eliminates interference between other links.

45 Claims, 16 Drawing Sheets

U.S. PATENT DOCUMENTS

| | | | | |
|---|---|---|---|---|
| 6,920,156 | B1 | 7/2005 | Manchester et al. | 370/522 |
| 6,954,428 | B2 | 10/2005 | Gotoh et al. | |
| 6,973,092 | B1 | 12/2005 | Zhou et al. | 370/412 |
| 7,016,365 | B1 | 3/2006 | Grow et al. | |
| 7,042,842 | B2 | 5/2006 | Paul et al. | |
| 7,050,448 | B2 | 5/2006 | Johnson et al. | |
| 7,068,654 | B1 | 6/2006 | Joseph et al. | |
| 7,068,672 | B1 | 6/2006 | Jones | 370/412 |
| 7,126,918 | B2 | 10/2006 | Roberts | |
| 7,136,356 | B2 | 11/2006 | Suzuki et al. | |
| 7,142,553 | B1 | 11/2006 | Ojard et al. | 370/421 |
| 7,145,873 | B2* | 12/2006 | Luijten et al. | 370/230 |
| 7,145,914 | B2 | 12/2006 | Olarig et al. | |
| 7,154,885 | B2* | 12/2006 | Nong | 370/380 |
| 7,180,857 | B2 | 2/2007 | Kawakami et al. | |
| 7,366,165 | B2 | 4/2008 | Kawarai et al. | |
| 7,443,851 | B2 | 10/2008 | Fukushima et al. | |
| 7,453,801 | B2 | 11/2008 | Taneja et al. | |
| 7,464,180 | B1 | 12/2008 | Jacobs et al. | |
| 7,486,678 | B1 | 2/2009 | Devanagondi et al. | |
| 7,545,801 | B2 | 6/2009 | Miller et al. | |
| 2002/0054567 | A1 | 5/2002 | Fan | 370/230 |
| 2002/0085578 | A1* | 7/2002 | Dell et al. | 370/422 |
| 2002/0099900 | A1 | 7/2002 | Kawarai et al. | 710/317 |
| 2002/0131412 | A1 | 9/2002 | Shah et al. | |
| 2002/0191588 | A1 | 12/2002 | Personick | 370/352 |
| 2003/0099194 | A1 | 5/2003 | Lee et al. | 370/229 |
| 2003/0118052 | A1 | 6/2003 | Kuhl et al. | 370/474 |
| 2003/0123468 | A1 | 7/2003 | Nong | 370/412 |
| 2003/0126297 | A1 | 7/2003 | Olarig et al. | |
| 2003/0179774 | A1 | 9/2003 | Saidi et al. | 370/468 |
| 2003/0223424 | A1 | 12/2003 | Anderson et al. | 370/392 |
| 2003/0227906 | A1 | 12/2003 | Hallman | |
| 2004/0037313 | A1 | 2/2004 | Gulati et al. | 370/465 |
| 2004/0213156 | A1 | 10/2004 | Smallwood et al. | |
| 2005/0002334 | A1 | 1/2005 | Chao | |
| 2005/0002410 | A1 | 1/2005 | Chao | 370/412 |
| 2005/0025141 | A1 | 2/2005 | Chao | 370/412 |
| 2005/0025171 | A1 | 2/2005 | Chao | 370/432 |
| 2005/0047334 | A1* | 3/2005 | Paul et al. | 370/229 |
| 2005/0201314 | A1 | 9/2005 | Hirano | |
| 2006/0203725 | A1 | 9/2006 | Paul et al. | |
| 2006/0239259 | A1* | 10/2006 | Norman et al. | 370/386 |
| 2008/0069125 | A1 | 3/2008 | Reed et al. | |
| 2009/0028152 | A1 | 1/2009 | Shimonishi | |

OTHER PUBLICATIONS

United States Patent and Trademark Office: Non-Final Office Action dated Aug. 8, 2007, U.S. Appl. No. 10/776,574, 5 pages.
United States Patent and Trademark Office: Non-Final Office Action dated Jan. 22, 2008, U.S. Appl. No. 10/776,574, 5 pages.
United States Patent and Trademark Office: Non-Final Office Action dated Sep. 4, 2007, U.S. Appl. No. 10/872,187, 6 pages.
United States Patent and Trademark Office: Final Office Action dated Feb. 12, 2008, U.S. Appl. No. 10/872,187, 8 pages.
United States Patent and Trademark Office: Non-Final Office Action dated Jul. 9, 2008, U.S. Appl. No. 10/872,187.
United States Patent and Trademark Office: Final Office Action dated Feb. 4, 2009, U.S. Appl. No. 10/872,187.
United States Patent and Trademark Office: Non-Final Office Action dated Jul. 14, 2009, U.S. Appl. No. 10/872,187.
United States Patent and Trademark Office: Non-Final Office Action dated Sep. 18, 2007, U.S. Appl. No. 10/872,332.
United States Patent and Trademark Office: Non-Final Office Action dated Feb. 13, 2008, U.S. Appl. No. 10/872,332.
United States Patent and Trademark Office: Final Office Action dated Oct. 23, 2008, U.S. Appl. No. 10/872,332.
United States Patent and Trademark Office: Non-Final Office Action dated Apr. 1, 2009, U.S. Appl. No. 10/872,332.
United States Patent and Trademark Office: Non-Final Office Action dated Jul. 25, 2008, U.S. Appl. No. 10/776,574.
United States Patent and Trademark Office: Non-Final Office Action dated Feb. 17, 2009, U.S. Appl. No. 10/776,574.
United States Patent and Trademark Office: Notice of Allowance Action dated Jan. 8, 2010, U.S. Appl. No. 10/872,187.
United States Patent and Trademark Office: Notice of Allowance dated Oct. 8, 2009, U.S. Appl. No. 10/776,574.
United States Patent and Trademark Office: Notice of Allowance dated Nov. 16, 2009, U.S. Appl. No. 10/872,332.

* cited by examiner

SQC: Source Queue Cell counter
DQC: Destination Queue Cell counter
DQF: Destination Queue Flag CRT: Credit Update
ROC: RTT Outstanding Cell counter
QOC: Queue Outstanding Cell counter

RTT=8
CUP=10

| TS | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| SQC | 0 | 1 | 1 | 1 | 1 | 1 | 1 | 2 | 3 | 3 | 2 | 1 | 1 | 1 | 0 | 0 | 0 | 0 | 0 | 0 | 0 | 0 | 0 | 0 | 0 | 0 |
| DQC | 0 | 0 | 0 | 0 | 0 | 0 | 1 | 2 | 2 | 2 | 1 | 1 | 1 | 1 | 0 | 1 | 1 | 0 | 1 | 0 | 0 | 0 | 0 | 0 | 0 | 0 |
| DQF | 0 | 0 | 0 | 0 | 0 | 1 | 0 | 0 | 0 | 0 | 1 | 0 | 0 | 0 | 0 | 0 | 0 | 0 | 0 | 0 | 0 | 0 | 0 | 0 | 0 | 0 |
| CRT | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| ROC | 0 | 0 | 1 | 2 | 3 | 4 | 0 | 0 | 0 | 0 | 1 | 2 | 2 | 2 | 3 | 3 | 0 | 0 | 0 | 0 | 0 | 0 | 0 | 0 | 0 | 0 |
| QOC | 0 | 0 | 1 | 2 | 3 | 4 | 5 | 5 | 5 | 5 | 6 | 7 | 7 | 7 | 8 | 4 | 4 | 4 | 4 | 4 | 4 | 4 | 4 | 4 | 4 | 0 |

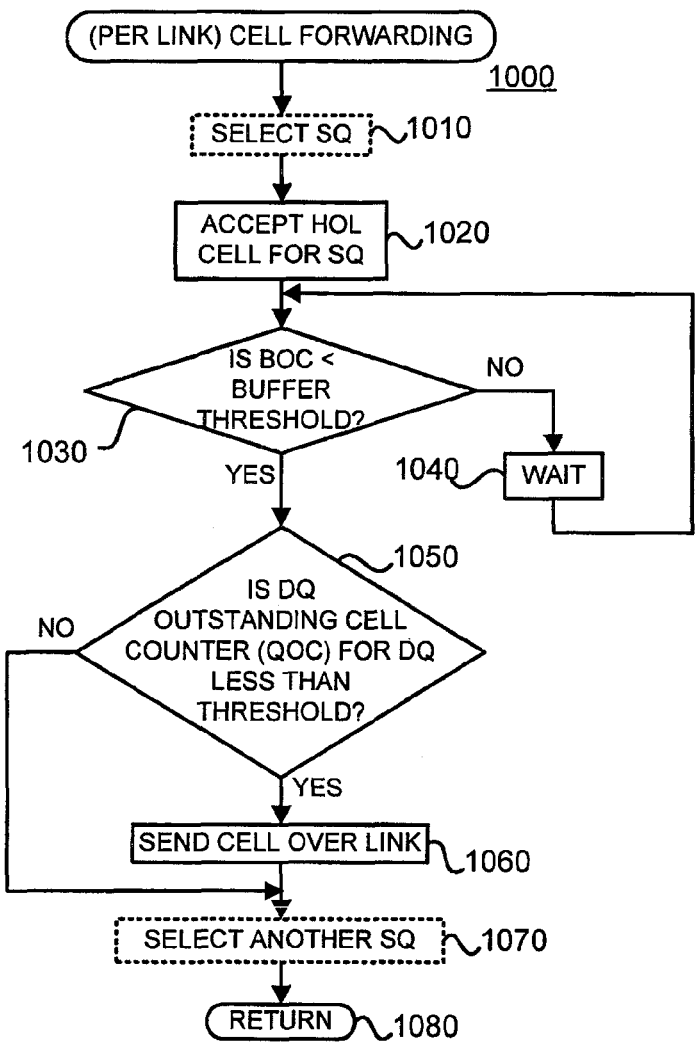
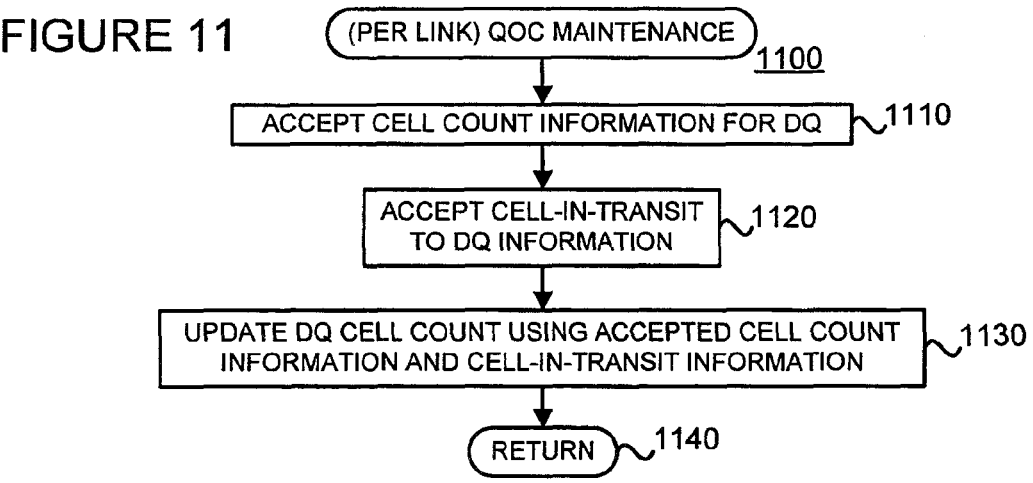

SWITCH MODULE MEMORY STRUCTURE AND PER-DESTINATION QUEUE FLOW CONTROL FOR USE IN A SWITCH

§ 0.1 RELATED APPLICATIONS

This application claims benefit to U.S. Provisional Application Ser. No. 60/479,733, titled "A HIGHLY SCALABLE MULTI-PLANE MULTI-STAGE BUFFERED PACKET SWITCH," filed on Jun. 19, 2003, and listing H. Jonathan Chao and Jinsoo Park as inventors (referred to as "the '733 provisional"). That application is incorporated herein by reference. The scope of the present invention is not limited to any requirements of the specific embodiments described in that application.

§ 0.2 FEDERAL FUNDING

This invention was made with Government support and the Government may have certain rights in the invention as provided for by grant number ANI-9906673 by the National Science Foundation.

§ 1. BACKGROUND OF THE INVENTION

1. Field of the Invention

The present invention concerns communications. In particular, the present invention concerns structures of switch module cell memory, and preventing cell memory overflow in large scale switches used in communications networks.

2. Related Art

To keep pace with Internet traffic growth, researchers continually explore transmission and switching technologies. For instance, it has been demonstrated that hundreds of signals can be multiplexed onto a single fiber with a total transmission capacity of over 3 Tbps and an optical cross-connect system (OXC) can have a total switching capacity of over 2 Pbps. However, the capacity of today's (Year 2003) core Internet Protocol (IP) routers remains at a few hundred Gbps, or a couple Tbps in the near future.

It still remains a challenge to build a very large IP router with a capacity of tens Tbps or more. The complexity and cost of building such a large-capacity router is much higher than building an optical cross connect system (OXC). This is because packet switching may require processing (e.g., classification and table lookup), storing, and scheduling packets, and performing buffer management. As the line rate increases, the processing and scheduling time available for each packet is proportionally reduced. Also, as the router capacity increases, the time for resolving output contention becomes more constrained.

Demands on memory and interconnection technologies are especially high when building a large-capacity packet switch. Memory technology very often becomes a bottleneck of a packet switch system. Interconnection technology significantly affects a system's power consumption and cost. As a result, designing a good switch architecture that is both scalable to handle a very large capacity and cost-effective remains a challenge.

The numbers of switch elements and interconnections are often critical to the switch's scalability and cost. Since the number of switch elements of single-stage switches is proportional to the square of the number of switch ports, single-stage architecture is not attractive for large switches. On the other hand, multi-stage switch architectures, such as a Clos network type switch, is more scalable and requires fewer switch elements and interconnections, and is therefore more cost-effective.

FIG. 1 shows a core router (CR) architecture 100 which includes line cards 110,120 a switch fabric 130, and a route controller (not shown) for executing routing protocols, maintenance, etc. The router 100 has up to N ports and each port has one line card. (Note though that some switches have ports that multiplex traffic from multiple input line cards at the ingress and de-multiplexes the traffic from the switch fabric to multiple line cards at the egress.) A switch fabric 130 usually includes multiple switch planes 140 (e.g., up to p in the example of FIG. 1) to accommodate high-speed ports.

A line card 110,120 usually includes ingress and/or egress functions and may include one or more of a transponder (TP) 112,122, a framer (FR) 114,124, a network processor (NP) 116,126, and a traffic manager (TM) 118,128. A TP 112,122 may be used to perform optical-to-electrical signal conversion and serial-to-parallel conversion at the ingress side. At the egress side, it 112,122 may be used to perform parallel-to-serial conversion and electrical-to-optical signal conversion. An FR 114,124 may be used to perform synchronization, frame overhead processing, and cell or packet delineation. An NP 116,126 may be used to perform forwarding table lookup and packet classification. Finally, a TM 118,128 may be used to store packets and perform buffer management, packet scheduling, and any other functions performed by the router architecture (e.g., distribution of cells or packets in a switching fabric with multiple planes).

Switch fabric 130 may be used to deliver packets from an input port to a single output port for unicast traffic, and to multiple output ports for multicast traffic.

When a packet arrives at CR 100, it determines an outgoing line to which the packet is to be transmitted. Variable length packets may be segmented into fixed-length data units, called "cells" without loss of generality, when entering CR 100. The cells may be re-assembled into packets before they leave CR 100. Packet segmentation and reassembly is usually performed by NP 116,126 and/or TM 118,128.

FIG. 2 illustrates a multi-plane multi-stage packet switch architecture 200. The switch fabric 230 may include p switch planes 240. In this exemplary architecture 200, each plane 240 is a three-stage Benes network. Modules in the first, second, and third stages are denoted as Input Module (IM) 242, Center Module (CM) 244, and Output Module (OM) 246.1M 242, CM 244, and OM 246 have many common features and may be referred to generally as a Switch Module (SM).

Traffic enters the switch 200 via an ingress traffic manager (TMI) 210 and leaves the switch 200 via an egress traffic manager (TME) 220. The TMI 210 and TME 220 can be integrated on a single chip. Therefore, the number of TM chips may be the same as the number of ports (denoted as N) in the system 200. Cells passing through the switch 200 via different paths may experience different queuing delays if the switch fabric has a queuing buffer in it. These different delays may result in cells arriving at a TME 220 out of sequence. However, if packets belonging to the same flow traverse the switch via the same path (i.e., the same switch plane and the same CM) until they have all left the switch fabric, there should be no cell out-of-sequence problem. FIG. 2 illustrates multiple paths between TMI(0) 210a and TME(0) 220a. The TMI 210 may determine the path ID (PID) of each flow using a flow ID (FID). The PID may correspond to a switch fabric plane 240 number and a CM 244 number in the plane 240.

In the embodiment 200 illustrated in FIG. 2, the first stage of a switch plane 240 includes k IMs 242, each of which has n inputs and m outputs. The second stage includes m CMs 244, each of which has k inputs and k outputs. The third stage includes k Oms 246, each of which has m inputs and n outputs. If n, m, and k are equal to each other, the three modules 242,244,246 may have identical structures.

From the TMI 210 to the TME 220, a cell traverses four internal links: (i) a first link from a TMI 210 to an IM 242; (ii) a second link from the IM 242 to a CM 244; (iii) a third link from the CM 244 to an OM 246; and (iv) a fourth link from the OM 246 to a TME 220.

In such a switch 200, as well as other switches, a number of issues may need to be considered. Such issues may include buffering in (switch modules of) the switch fabric and flow control. Section 1.2.1 compares several buffering strategies at SMs and explains their shortcomings. Section 1.2.2 describes the need for flow control and limitations of known flow control schemes.

§ 1.2.1 Switch Module Memory Structures

A switch module (SM), such as IM 242, CM 244 and OM 246 for example, can be memory-less, or can buffer cells. Each of these options is introduced below.

A memory-less SM may require global coordination among all TMIs 210 to resolve any output port contention before a TMI advances a cell into the switch plane. The complexity of the global coordination can be very high and the arbitration time for such global coordination can be quite long. Accordingly, a switch fabric with memory-less SMs might not be feasible for a large scale, high-speed switch.

An SM may buffer cells in a number of ways. FIG. 3A illustrates a cross-point SM having a number of inputs 330, a number of outputs 340, and some means for arbitrating 320 cells contending for the same output port. Each cross point-may include a queue 310 for each priority. A queue may be thought of as a logical construct. That is, a number of logical queues can be combined on a physical memory. Indeed, it is possible to have logical queues provided as needed, such that a logical queue not currently needed reserves no memory. A buffer is a physical memory area. A memory may be partitioned into a number of buffers. An SM may use one of a number of buffering techniques, such as cross-point-buffered, shared-memory, output-buffered, input-buffered, etc. These buffering techniques are introduced below with reference to FIGS. 3B-3E. The memory size in the SM affects system performance. Generally, the larger the memory size, the better the performance. However, memory size is limited by VLSI technology.

§ 1.2.1.1 Memory Size

Still referring to FIG. 3A the following examples assume that the SM has 4096 cross-points (i.e., 64 inputs*64 outputs) and each cross-point has two (2) queues 310 (i.e., high and low scheduling priorities). Each of the two queues 310 corresponds to a scheduling priority level. Therefore, in this exemplary embodiment, each SM has 8192 queues 310. Each queue 310 can receive and send at most one cell in each time slot. An incoming cell (i.e., a cell arriving from one of the input ports 330) is stored at one of the queues 310 according to its destination (i.e., the one of the output ports 340 for which it is destined) and scheduling priority level.

One way to serve cells with different priorities is to use strict priority. If strict priority serving is used, cells in the lower priority queues are served only when there are no cells in the higher priority queues waiting to be served. An arbiter 320 chooses a cell to send to the next stage in every time slot using a packet-scheduling algorithm.

§ 1.2.1.2 Sizes of Queues

The size of each queue 310 should be equal to or greater than the round-trip time (RTT) between the source queue (SQ) (i.e., the queue at the upstream SM of a link) and the destination queue (DQ) (i.e., the queue at the downstream SM of a link). In addition to the RTT, the DQ should also accommodate alignment delay because cells may arrive at different phases of the DQ clocks.

Regarding alignment delays, as illustrated in FIG. 4, the clock signals on each TMI 210 can differ by as much as one time slot. At a specific time, one TMI 210a may be at the beginning of a time slot while another TMI 210b may be at the end of a time slot.

Regarding RTT delay, this delay is a function of distance between a source queue and a destination queue and the speed at which the cell can travel. In the following examples, it is assumed that a cell can travel at 5 nsec per meter because the propagation speed of an electromagnetic signal is known to be about 200,000 km per second.

Accordingly if the distance between the SQ and the DQ is 100 m (For example, an IM chip and a CM chip can be located at circuit packs of different racks, and the two racks can be placed at different floors in the same building or at different buildings.), the RTT is 1 psec (i.e., 100 m*2*5 nsec/m,). If one time slot is assumed to be 204.8 nsec (i.e., 512 bits/2.5 Gbps), the RTT is five (5) time slots. Thus, in this example, the queue size should hold at least five (5) cells. In addition, clock misalignments should be accounted for. Therefore, it is reasonable to assume that the RTT between the TMI 210 and the IM 242 could be as much as two (2) time slots. If the IM 242 and the OM 246 are on the same circuit pack, it is similarly reasonable to assume that the RTT between the OM 246 and the TME 220 could be four time slots. (In the foregoing example, the distance is the distance between IM chip and CM chip. It was assumed that TM chip and IM chip are on the same shelf, or at least on the same rack. Therefore, it is assumed that the distance between TMI and IM will be at most a few meters, which can be translated less than one (1) time slot. It was further assumed that the RTT between TMI and IM is two (2) time slots—one (1) time slot for the distance and another (1) time slot for the misalignment.)

If the distance between TMI 210 and IM 242 is less than a few meters (which should be the case if it is assumed that TMI 210 and IM 242 are on the same shelf), the queue size at IM 242 doesn't need to be large. Since one time slot is 204.8 nsec, one time slot corresponds to 41 m. Since the distance between TMI 210 and IM 242 is assumed to be less than 41 m, the minimum queue size at IM 242 is two (2) cells—one (1) cell for RTT and another (1) cell for misalignment.

The queue size at CM 244 and OM 246 should be big enough to accommodate the RTT and the timer misalignment. If the distance between IM 242 and CM 244 is 280 m (Note that although IM and CM are on the same switch plane, they can be put into different racks, which can be a few hundred meters apart.), the queue size at CM should be at least 15 cells (=14 cells for RTT and 1 cell for the timer misalignment). If IM 242 and OM 246 are on the same circuit pack, the queue size at OM 246 should also be at least 15 cells. (Note that in this example, OM is the DQ and CM is the SQ, and the distance between OM and CM may be the same as the distance between IM and CM.)

Having introduced the design of memory size and buffer size, various buffering techniques are now described in § 1.2.1.3 below.

§ 1.2.1.3 Buffering Techniques

In a cross-point-buffered SM such as the one illustrated in FIG. 3B, each queue has a dedicated memory space and no memory space is shared. Therefore number of buffers 350 is the same as the number of queues 310. A cross-point-buffered SM (e.g., having 64 inputs, 64 outputs, and two priorities) will require 8192 (i.e., 64 input*64 outputs*2 priorities) separate buffers 350. Assuming that that the RTT for one SQ is equivalent to 15 cells, and the memory size will be 122,880 (=8192 queue buffers×15 cells/queue) cells (which may be 64 Bytes each). This size memory is far beyond year 2003 state-of-the-art ASIC technology limit. Current (Year 2003) state-of-the-art technology limits the memory size implemented in a single chip to a few Mbits. If the cell size is 64 Bytes, one memory can contain a few thousand cells.

FIG. 3D illustrates an output-buffered SM in which 64 queues for 64 input ports are grouped to a buffer 370 associated with an output port. Thus, in each buffer, 64 queues share the memory space of the buffer. However, queues in different buffers do not share memory space. An output-buffered SM may require a large memory to accommodate the RTT propagation delay coming simultaneously from many senders. For example, if all 64 SQs are sending to the same DQ, the DQ size must be at least 960 cells (i.e., 15*64 cells) to prevent buffer overflow. Since a single memory may need to accommodate 128 buffers (128=64 ports*2 priority levels), the memory size must be at least 122,880 cells (i.e., 128 buffers*960 cells/buffer), which is the same with cross-point-buffered SM. If the buffer size of output-buffered SM is smaller than 960 cells, the senders should communicate each other in order to avoid buffer overflow. Such communication between senders makes the implementation difficult.

FIG. 3C illustrates a shared-memory SM, all queues share the whole memory space and there is only one buffer 360. Shared-memory SMs have two problems. First, the memory would have to write 64 cells and read 64 cells within a cell time slot. Since the time slot is 204.8 nsec, the memory cycle time would be 1.6 nsec (i.e., 204.8 nsec/(64 writes+64 reads)), which is too challenging for current (Year 2003) state-of-the-art technology. A second problem is ensuring that the queues don't overflow, which may require some sort of flow control.

As noted above, a design consideration for most buffered switch fabrics is flow control. More specifically, a buffer may become full for a large packet. If the buffer is full, the SM should discard cells or implement a handshaking scheme so that the buffer does not overflow. If the upstream modules do not communicate with each other, they can send cells destined for the same DQ at the same time. Under hot-spot traffic, cells destined for the hot-spot port can monopolize the buffer and the other cells destined for a non-hot-spot port can be blocked. This can lead to a deadlock situation. Although the senders may coordinate with each other to prevent buffer overflow, a deadlock situation can still occur. For example, assume that the shared memory size is 2048 cells. In the exemplary switch fabric described above, although one memory may include 8192 queues and each queue size must be at least 15 cells, most queues can be empty. If the number of cells in the shared memory exceeds a threshold (e.g., 1024 cells), the receiver may send a backpressure signal to all senders and in response, all senders may stop transmission until the receiver informs them that the shared memory is no longer congested. This can cause a deadlock under a packet interleaving scheme, such as the one described in the '733 provisional.

FIG. 3E illustrates the input-buffered SM in which 64 queues for 64 output ports are grouped to a buffer 370 associated with an input port. An input-buffered SM may require a small memory because it receives at most one cell in a time slot. Since the 64 queues can share the same memory space, the buffer size can be as small as a little larger than 15 cells (e.g., 32 cells). The flow control for the input-buffered SM will be simple as described in § 1.2.2 because the DQ may need to inform the status to only one upstream SM.

§ 1.2.2 Flow Control

As can be appreciated from the foregoing, one of the challenges in building a large capacity switch is to use memory efficiently. Off-chip memory takes a long time to access, while present (Year 2003) on-chip memory can contain at most a few thousand 64 Byte cells. Providing a large memory at line cards and a small memory at switch fabric cards is common. When a cell is transmitted over a link, the receiver should have free memory space to store the cell until it is transmitted to the next stage. If the receiver's limited memory becomes full, the sender should hold the cells until the receiver has free space. Therefore, a flow control mechanism may be implemented to avoid cell loss in the switch fabric.

§ 1.2.2.1 Previous Approaches to Flow Control and Their Limitations

The paper, H. T. Kung, Trevor Blackwell, and Alan Chapman, "Credit-Based Flow Control for ATM Networks: Credit Update Protocol, Adaptive Credit Allocation, and Statistical Multiplexing," *Proceedings of ACM SIGCOMM '94*, pp. 101-114 (September 1994). (incorporated herein by reference and referred to as "the Kung paper") proposed a credit-based, per virtual connection (VC), link-by-link flow control scheme for ATM networks, called the N23 scheme. Flow control based on credits is an efficient way of implementing per VC, link-by-link, flow control. The credit-based flow control method generally works over each flow-controlled VC link. Before forwarding any data cell over the link, the sender first needs to receive credits for the VC via credit cells sent by the receiver. Periodically the receiver sends credits to the sender indicating availability of buffer space for receiving data cells of the VC. After having received credits, the sender is eligible to forward some number of data cells of the VC to the receiver according to the received credit information. Each time the sender forwards a data cell of a VC, it decrements its current credit balance for the VC by one.

The receiver is eligible to send a credit cell to the sender each time after It has forwarded N2 data cells since the previous credit cell for the same VC was sent. The credit cell will contain a credit value for the combined area consisting of the N2 and N3 zones. N2 and N3 are fixed numbers. The sum of N2 and N3 is equal to the buffer size. If the credit is less than N2, it is in N2 zone. Otherwise, it is in N3 zone. Upon receiving a credit cell with a credit value of C for a VC, the sender is permitted to forward up to C-E data cells of the VC before the next successfully transmitted credit cell for the VC is received, where E is the number of data cells the sender has forwarded over the VC for the past time period of RTT (where RTT is a round-trip time of the link expressed in number of cell time slots, including the processing delays at sender and receiver). The subtraction of E from C accounts for in-transit cells from the sender to the receiver, which the receiver no knowledge of when it sent the credit cell. Specifically, the sender maintains a counter, called Credit_Balance, for the VC. Initially, Credit_Balance is set to be VC's credit allocation, N2+N3. Each time the sender forwards a data cell, it decrements the Credit_Balance by one. When the Credit_Balance reaches zero, the sender stops forwarding data cells. When receiving a new credit cell resulting in a positive value of C-E, the sender will be eligible to forward data cells again. More specifically, when receiving a credit cell for a VC, the sender will immediately update its Credit_Balance for the VC using Credit_Balance=C-E.

The N2 value can be a design or engineering choice. Suppose that x is the number of credit transactions a credit cell can incorporate. Note that one credit cell can have credits for many VCs. Thus, for example, if one credit cell has credits of 6 VCs, x=6. Then the bandwidth overhead of transmitting credit cells is 100/(N2*x+1) percent. If one credit cell can incorporate 6 credits (i.e., x=6) and the credit cell is sent right after 60 data cells are transmitted (i.e., N2=10), the bandwidth overhead is 1.64%. The larger N2 is, the lower the bandwidth overhead, but each VC will use more buffer.

The N3 value is determined by its bandwidth requirement of the VC. Let $B_{VC}$ be the targeted average bandwidth of the VC over the time RTT, expressed as a percentage of the link bandwidth. Then it can be shown that to prevent data and credit underflow, it suffices to choose N3 to be $B_{VC}$*RTT. By increasing the N3 value, the VC can transport data cells at a proportionally higher bandwidth.

Unfortunately, the N23 scheme discussed in the Kung paper will not work with a multi-plane, multi-stage, packet switch because the number of VCs can be too big to be practical. A VC is defined as a TCP connection. If the number of TCP connections for a link is 100,000, the SM should have a separate queue for each VC, and the downstream SM should send a credit cell for each VC periodically. This may consume a significant portion of the link bandwidth. However, large-scale, high-speed, switches often use a multi-plane, multi-stage architecture. Accordingly, an improved flow control scheme that will work with multi-plane, multi-stage architectures is needed.

§ 2. SUMMARY OF THE INVENTION

To use the memory space more effectively, the present invention may allow cell memory to be shared by an input link and all output links. To prevent one flow from occupying the entire memory space, the present invention may set a threshold for the queue. The queue threshold may accommodate the RTT delay of the link.

Cells move from an upstream switch module (SM) to a downstream SM. If the downstream SM doesn't have memory space to receive a new cell, the upstream SM holds the cell until there is free memory space in the downstream SM. A credit is the number of cells remaining at the DQ. In one embodiment of the invention, a credit is sent from the downstream SM to the upstream SM via the cell header in every credit period per link. One embodiment of the invention inherently recovers any cell and/or credit loss. Increasing the credit period reduces the cell header bandwidth but the performance degradation is not significant. Sending a credit per link simplifies implementation and eliminates interference between other links.

§ 3. BRIEF DESCRIPTION OF THE DRAWINGS

FIG. 10 is a flow diagram of an exemplary method that may be used to perform per link cell forwarding in a manner consistent with the present invention.

FIG. 11 is a flow diagram of an exemplary method that may be used to maintain a per link destination queue outstanding cell count in a manner consistent with the present invention.

§ 4. DETAILED DESCRIPTION

Figure 1:
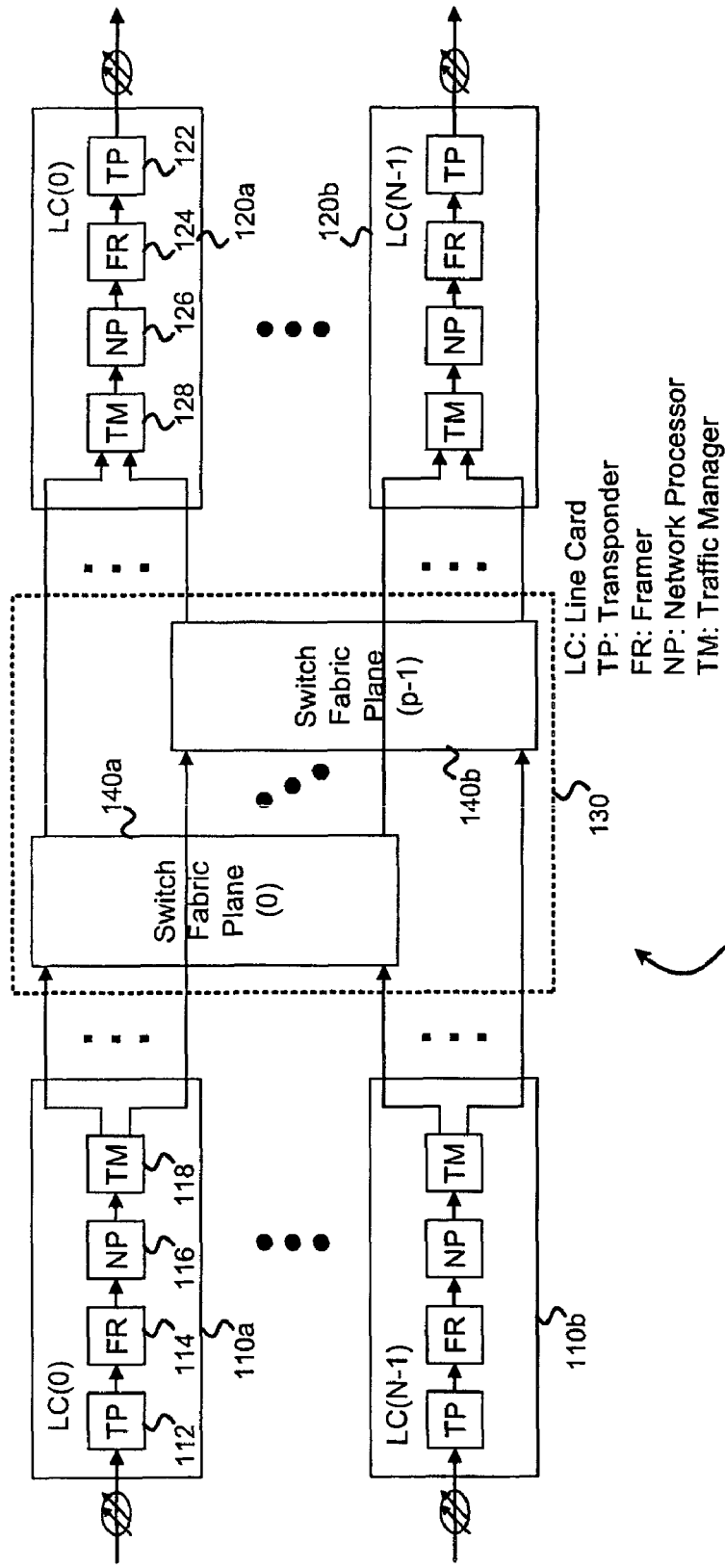
FIG. 1 is a block diagram of an exemplary switch environment in which, or with which, the present invention may be used.
Figure 2:
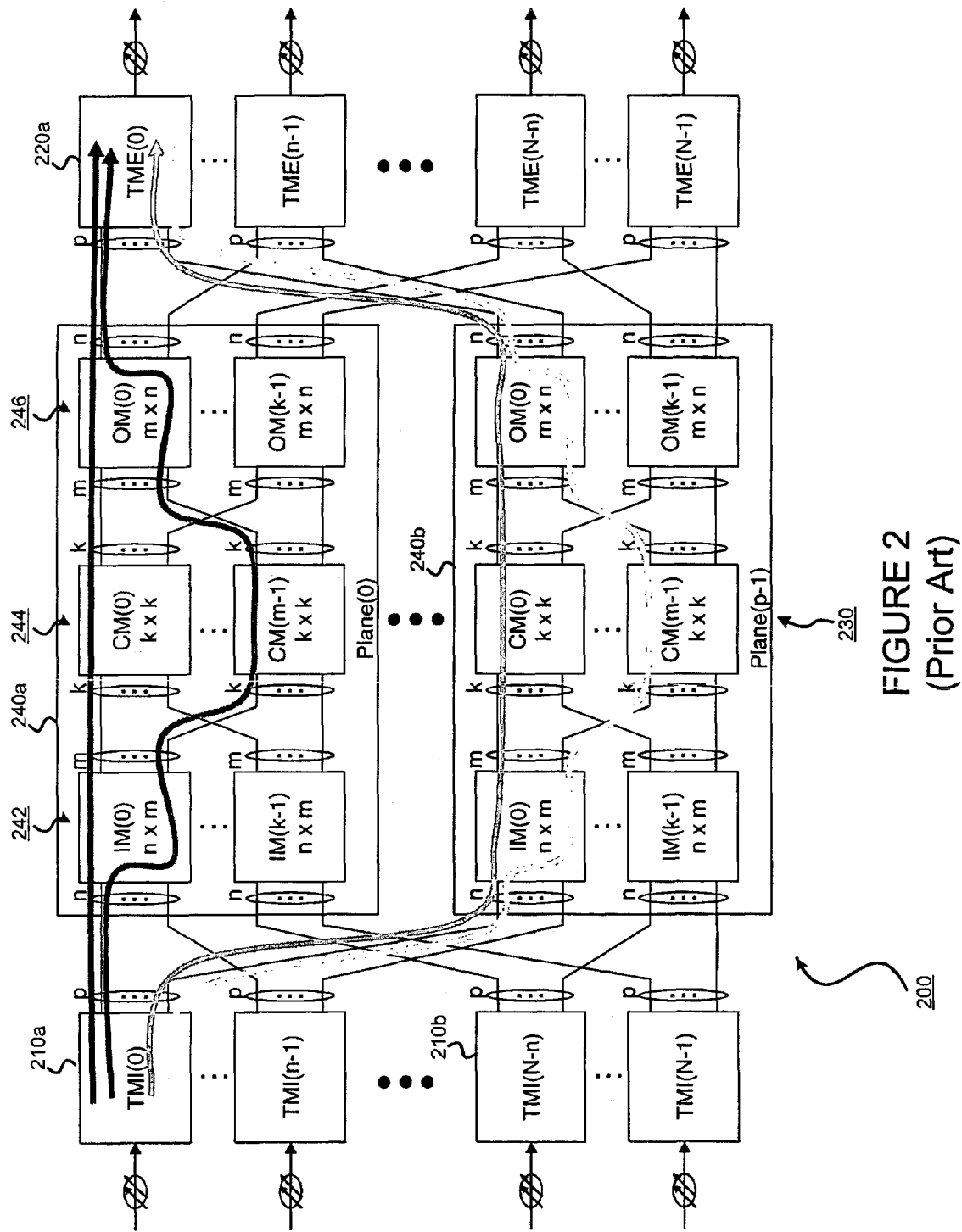
FIG. 2 illustrates alternative paths for a given {input port, output port} pair through a multi-stage switch.

The present invention may involve novel methods, apparatus, message formats and/or data structures for providing efficient buffering at an SM, and may provide flow control. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, abbreviations and letter symbols used in the specification are introduced in § 4.1. Then, exemplary embodiments of the present invention are described in § 4.2. Finally, some conclusions are set forth in § 4.3.

§ 4.1 Abbreviations

The following letter symbols are used in the specification.

N: switch size, which is number of ports in the system (N=n*k)
M: buffer size
R: number of reassembly queues in each TME
n: module size, which is the number of inputs at the IM or the number of outputs at the OM
m: number of CMs
k: number of IMs/OMs
p: number of planes
q: number of priorities
u: hot spot probability
v: heavy flow probability
l: average packet size in cells
d1: distance between the TM and IM/OM in units of cell slot
d2: distance between the IM/OM and CM in units of cell slot
f1: number of normal flows (e.g., 100,000)
f2: number of heavy flows (e.g., 10)
Q_sm: Queue size in SM e.g.,
B_sm: Buffer size in SM (e.g., 32)
Q_voq: VOQ size in TMI (e.g., 1023 cells)
Q_raq: RAQ size in TME (e.g., 255 cells)
B_tmi: Buffer size in TMI (e.g., 2 million cells)
B_tme: Buffer size in TME (e.g., 2 million cells)

The following abbreviations are used in the specification.
AP: Acknowledgement Period
ASIC: Application Specific Integrated Circuit
ATM: Asynchronous Transfer Mode
BOC: Buffer Outstanding Cell counter
BOP: Beginning Of Packet cell BRC: Buffer Reserved Cell counter
CAM: Content Addressable Memory
CI: Cell Interleaving
CM: Center Module
COP: Continue Of Packet
CPI: Complete Packet Interleaving
COSQ: Class Of Service Queue
CR: Core Router
CRC: Cyclic Redundancy Check
CRT: CRediT update
CTYPE: Cell TYPE
DEST: DESTination
DPI: Dynamic Packet Interleaving
DQ: Destination Queue
DQC: DQ Counter
EOP: End Of Packet
FGID: Flow Group ID
FID: Flow ID
FIFO: First In First Out queue
FR: FRamer
Gbps: Giga bits per second (i.e., $10^9$ bps)
HEC: Header Error detection and Correction
HOL: Head Of Line
ID: IDentification
IM: Input Module
IP: Internet Protocol
LC: Line Card
LOC: Link Outstanding Cell
Mbits: Mega bits
MHQ: Multicast High-priority Queue
MLQ: Multicast Low-priority Queue
MPLS: Multi-Protocol Label Switching
MRC: Maximum number of Reserved Cells
NP: Network Processor
OM: Output Module
OPC: Outstanding Packet Counter
OXC: Optical Cross-connect System
PACK: Packet ACKnowledgment
Pbps: Peta bits per second (i.e., $10^{15}$ bps)
PID: Path ID
POS: Packet Over SONET
PPI: Partial Packet Interleaving
QOC: Queue Outstanding Cell counter
QRC: Queue Reserved Cell counter
RAQ: ReAssembly Queue
ROC: RTT Outstanding Cell counter
RR: Round Robin
RTT: Round-Trip Time
SCP: Single Cell Packet cell
SM: Switch Module
SQ: Source Queue
Tbps: Tera bits per second (i.e., $10^{12}$ bps)
TM: Traffic Manager module
TMI: Ingress TM
TME: Egress TM
TP: TransPonder
TS: Time Slot
UHQ: Unicast High-priority Queue
ULQ: Unicast Low-priority Queue
VC: Virtual Clock
VOQ: Virtual Output Queue
VPQ: Virtual Path Queue
WRED: Weighted Random Early Discard
WRR: Weighted Round Robin § 4.2 Exemplary Embodiments Exemplary embodiments for SM memory are described in § 4.2.1. Then, exemplary embodiments for providing flow control are described in § 4.2.2.

§ 4.2.1 Input-Buffered SM Memory Structure

Figure 3A:
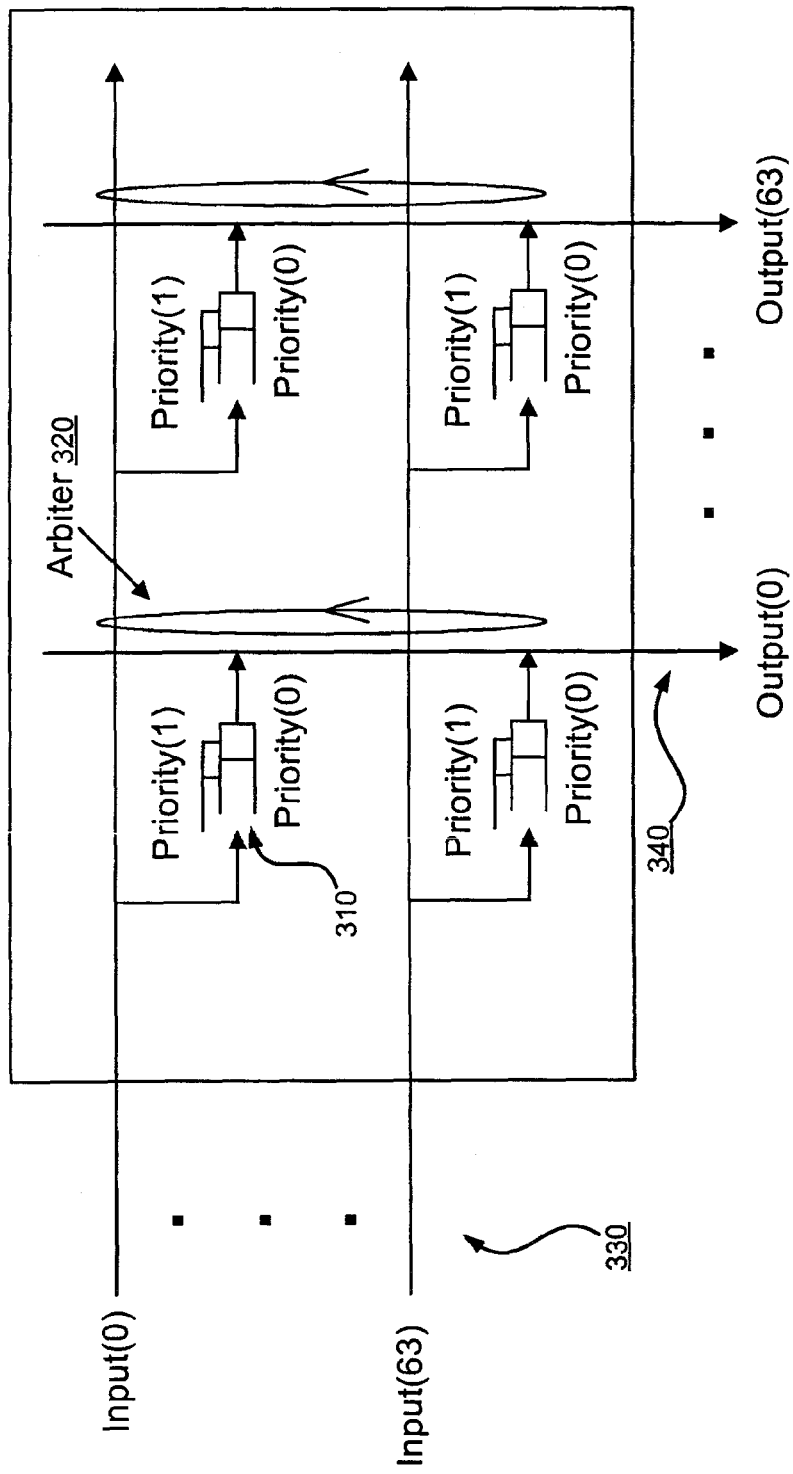
FIGS. 3A-3E illustrate various queuing techniques in a buffered SM.
Figure 3B:
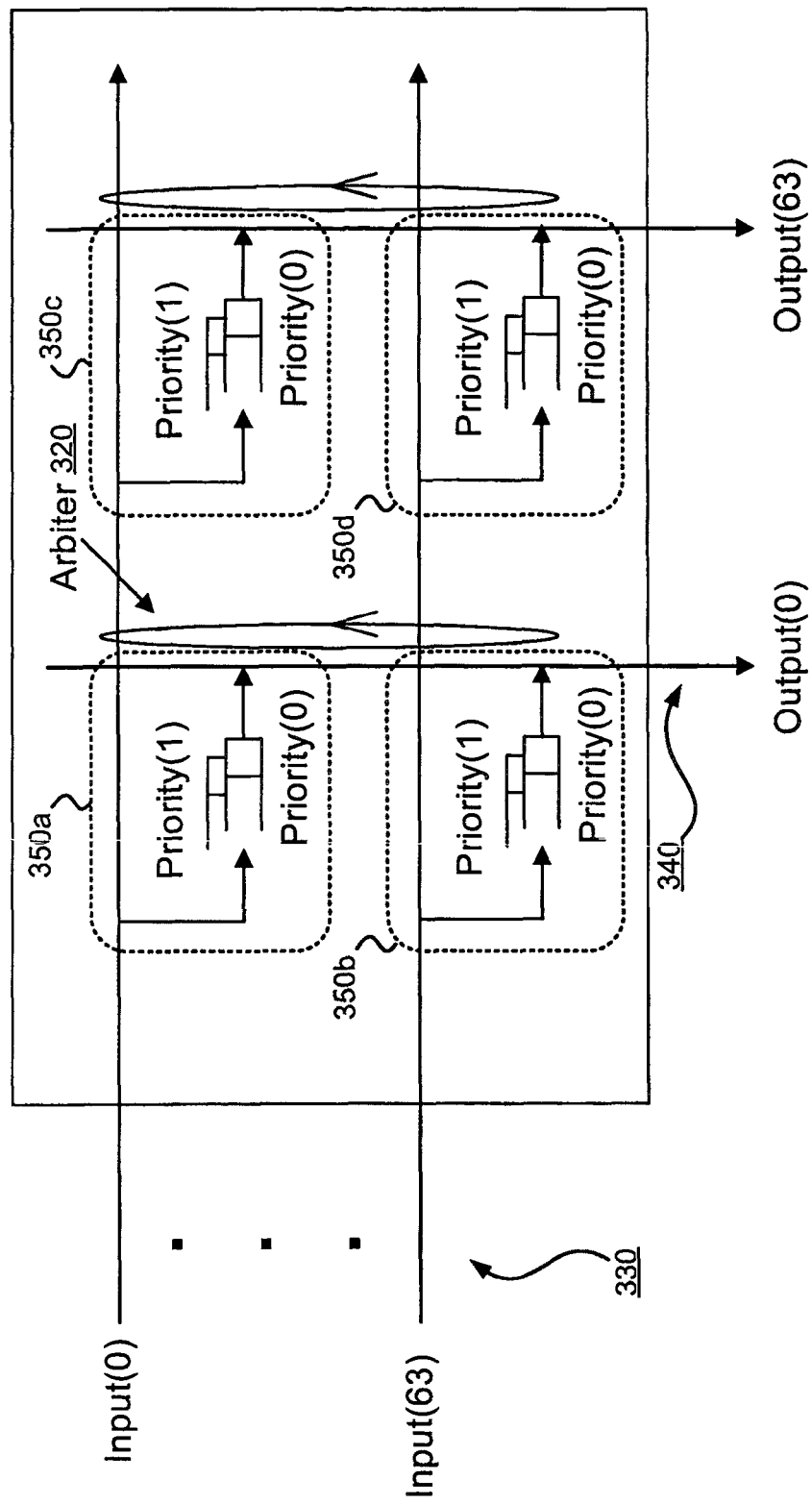
Figure 3C:
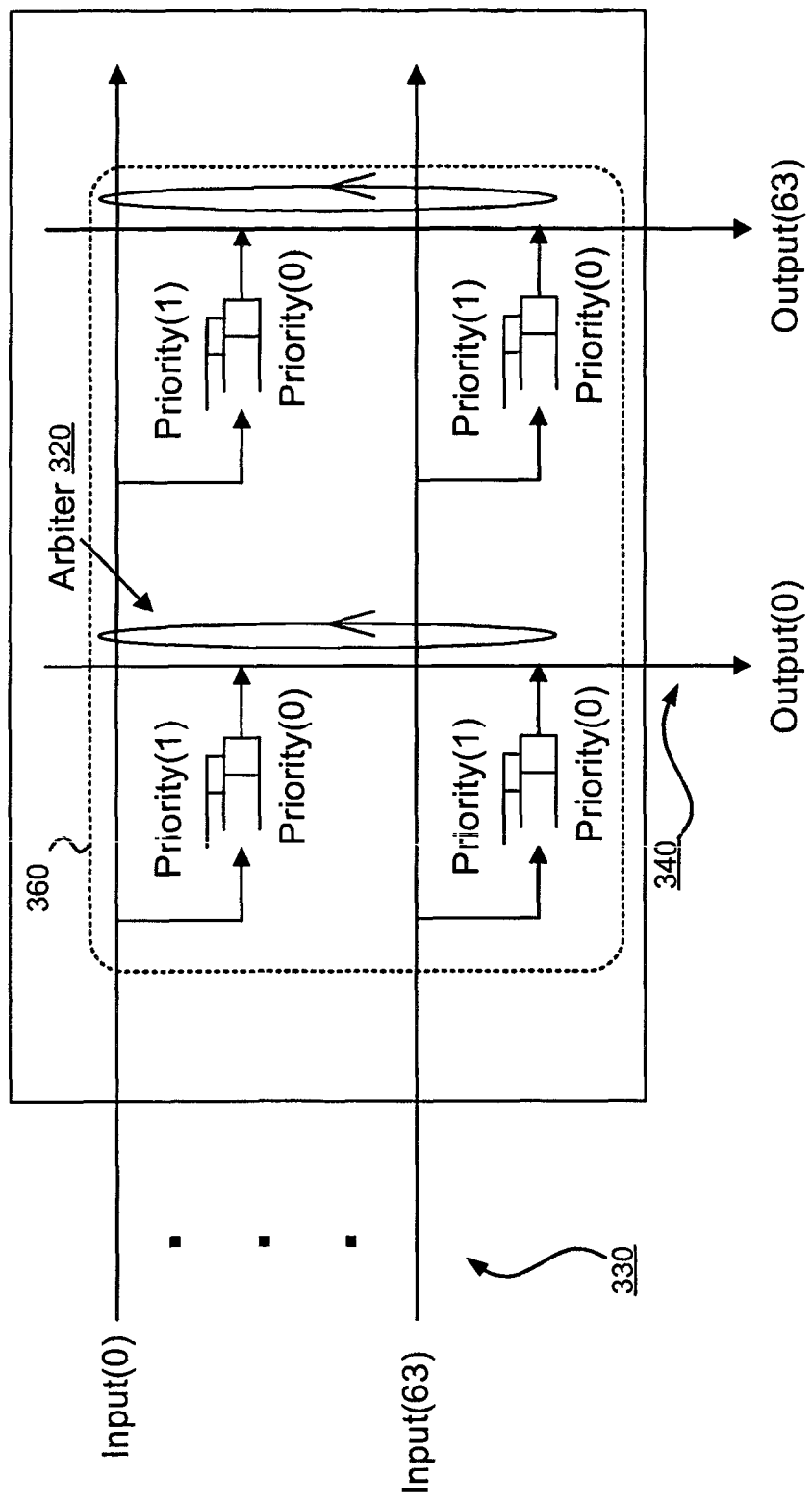
Figure 3D:
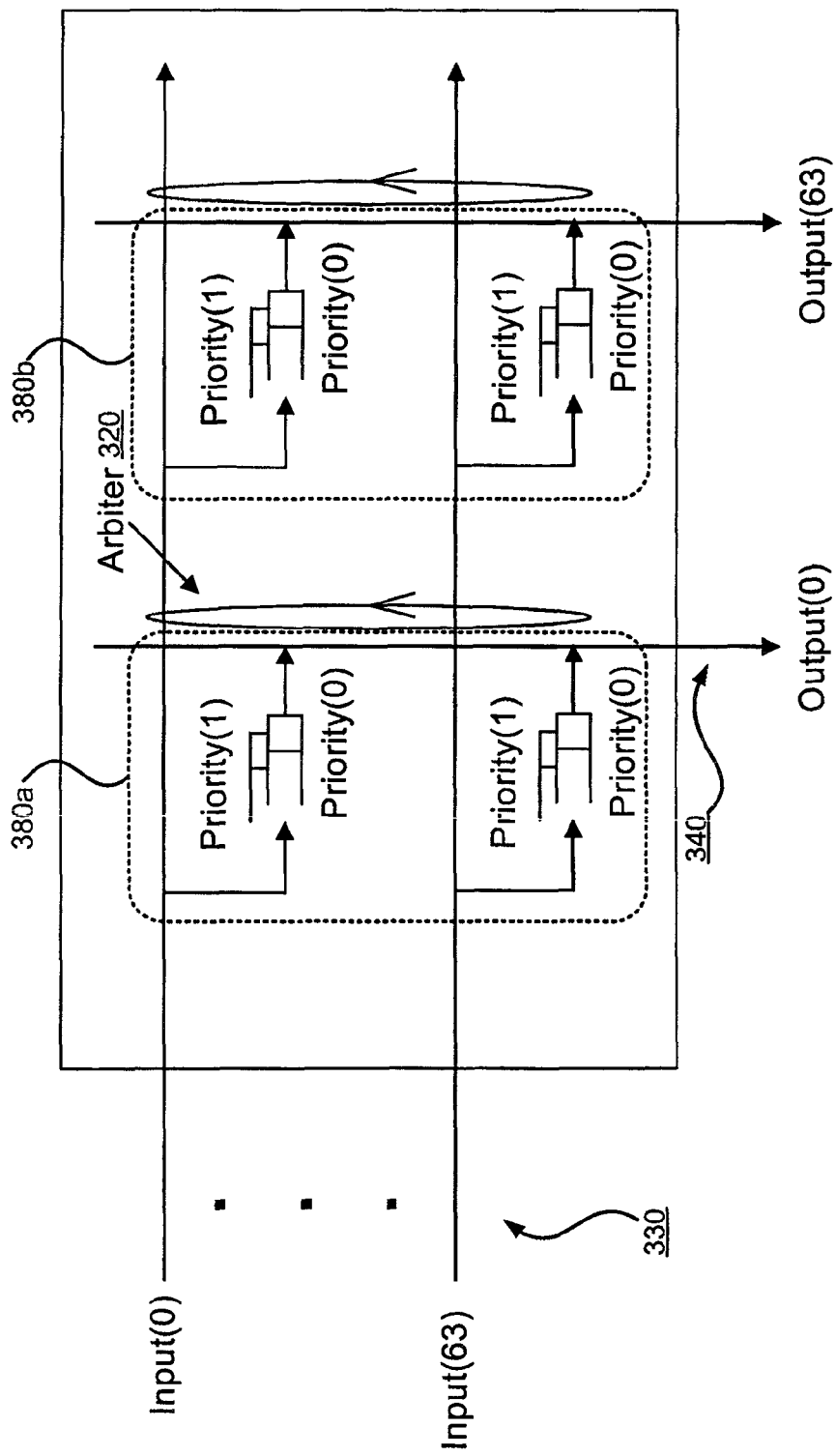
Figure 3E:
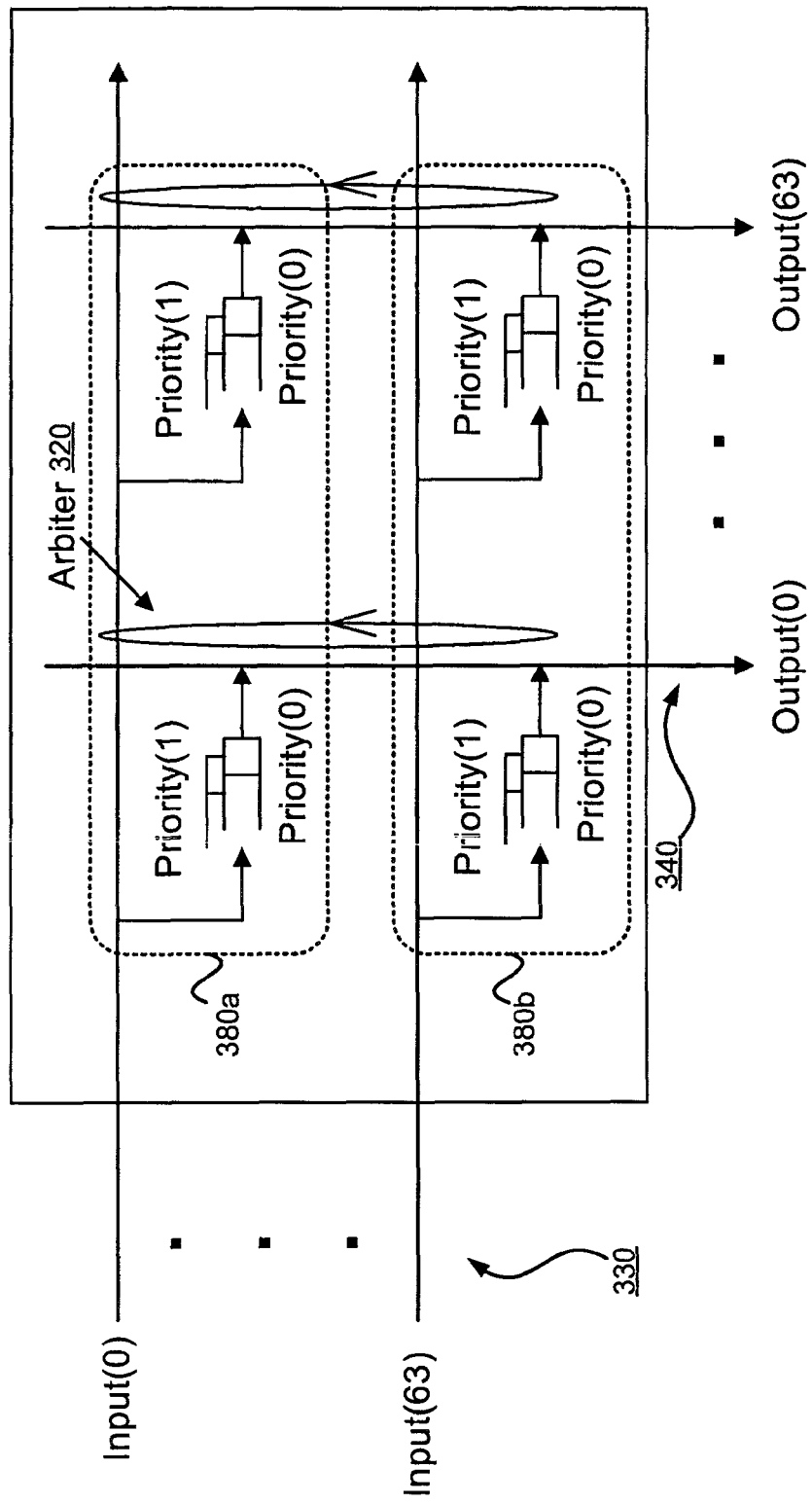

One way to mitigate the problems of shared memory SM in a switch fabric, such as the one introduced in the § 1.2 above, is to partition the memory into 128 buffers (i.e., 64 inputs*2 scheduling priorities) 380 and allow each buffer 380 to be shared by 64 queues. Each buffer 380 should be shared by 64 queues associated with the input link, as shown in FIG. 3E, because this simplifies flow control. More specifically, an advantage of an input-buffered SM is that each buffer 380 receives at most one cell per time slot.

Although a buffer 380 may include 64 queues, it is likely that most queues of the buffer 380 are empty at any given time. Therefore, in one embodiment of the present invention, the buffer size is smaller than the sum of 64 queues. The buffer size would be 960 cells (i.e., 64 queues*15 cells) if they do not share at all. For example, in one embodiment in which a buffer is associated with, or includes, 64 queues, the buffer size is much smaller (e.g., 32 cells). However, with such a reduced sized buffer, a flow control scheme, such as one of those described in § 4.2.2 below, should be employed to prevent buffer overflow.

Table 1 lists the SM memory sizes when n=m=k=64, q=2 and queue size is 15 cells for the SM structures discussed in § 1.2 above, where the last row indicates the SM structure in accordance with an exemplary embodiment of the invention.

TABLE 1

| SM STRUCTURE | BUFFERS PER MEMORY | BUFFER SIZE | MEMORY SIZE |
| --- | --- | --- | --- |
| Memory-less SM | 0 | 0 | 0 |
| Cross-point-buffered SM | 8,192 | 15 cells | 122,880 cells |
| Output-buffered SM | 128 | 960 cells | 122,880 cells |
| Shared-buffered SM | 1 | 2,048 cells | 2,048 cells |
| Input-buffered SM | 128 | 32 cells | 4,096 cells |

In the embodiment of the invention illustrated in FIG. 3E, a buffer 380 receives, at most, one cell in a time slot and sends, at most, min(n, M) cells, where n is the module size (i.e., the number of outgoing links in SM) and M is the buffer size in cells. Accordingly, if M is greater than n, the buffer is read at most n times in a time slot, while if M is smaller than n, the buffer is read at most M times in a time slot.

If the traffic is distributed uniformly among the paths, it is likely that most queues in a buffer will be empty because each SM may have only a few cells in its buffer. If the buffer size is less than 64 cells (i.e., the number of outgoing links in the SM), the buffer doesn't need to send 64 requests. If, for example, the buffer size is 32 cells, the buffer is read, at most, 32 times in a time slot even though the number of outgoing links may be larger. That is, in the worst case, if all 32 requests are granted by the arbiters, the number of reads should be 32. In this case, if the cell size is 64 bytes and the link speed is 2.5 Gbps, the required memory speed becomes 6.2 nsec (i.e., 64 bytes*8 bytes/bit/(2.5 Gbps*(32+1))), which is achievable with the current (2003) technology. Table 2 shows the memory speed for this exemplary SM when each buffer sends 32 requests.

TABLE 2

| | SM memory speed | | | | |
| --- | --- | --- | --- | --- | --- |
| | TMI | IM | CM | OM | TME |
| Write | 5 | 1 | 1 | 1 | 1 |
| Read | 1 | 32 | 32 | 32 | 1 |
| Bandwidth | 15 Gbps | 82.5 Gbps | 82.5 Gbps | 82.5 Gbps | 5 Gbps |
| Speed | 34 nsec | 6 nsec | 6 nsec | 6 nsec | 102 nsec |

The average number of reads from a buffer (or more precisely, from a set of buffers associated with an input link, where there is more than one priority) should be the same as the output link utilization because the number of buffers (or collections of buffers) and the number of output links are the same. The output link utilization should be one divided by the internal speedup when the offered load is 100%. Thus, for example, if the internal speedup is assumed to be 1.6, the output link utilization should be 0.625. In view of the foregoing, even slower memory than that indicated in Table 2 can be used if each buffer (or collection of buffers) sends only a few requests (e.g., four) per time slot to the arbiter.

Having illustrated how the SM buffer queue structure of the present invention can be used in a large scale, multi-path switch fabric, flow control schemes that may be used are now described in § 4.2.2 below.

§ 4.2.2 Per DQ Credit-Based Flow Control

Recall that the N23 scheme discussed in the Kung paper will not work with a multi-plane, multi-stage, packet switch, such as the one described in the '733 provisional. The scheme described below, referred to as "the DQ scheme" is different from the N23 scheme in a number of ways. For example, the DQ scheme operates per DQ, while the N23 scheme operates per VC. The DQ scheme may use N3, while the N23 scheme uses N2+N3. The DQ scheme may use cell overhead to carry credit information, while the N23 scheme uses separate credit cells. The DQ scheme may use non-wraparound counters, rather than the wraparound counters used by the N23 scheme. Finally, one embodiment of the DQ scheme is lossless while the N23 scheme is lossy.

More specifically, the N23 scheme discussed in the Kung paper works on a per VC basis. However, in a multi-plane, multi-stage switch fabric, one VC corresponds to a flow. That means the number of VCs may be too big to maintain. More specifically, according to Internet measurements, a 10 Gbps input port has about 400,000 different flows. Although they are spread over 400 different paths, each path may have about 1,000 flows, which is much larger than the number of DQs (e.g., 64). If the number of VCs is too large, it might not be feasible to implement the N23 scheme because the sender and receiver have to maintain counters per VC. For example, the link between a CM 244 and an OM 246 can deliver in the worst case 524,288 flows (i.e., 4096 input ports (64 ports*64 TMIs)*64 output ports (64 ports*one TME)*2 priorities).

Therefore, rather than operate on a VC basis, the present invention may control the flow on a per DQ basis. In the exemplary SM described above with reference to FIG. 3E, there are 128 DQs (64 high priority queues and 64 low priority queues) per input. It is feasible for the sender to maintain 128 sets of counters—one set per DQ. However, it is still challenging to have 128 separate DQs due to memory size limitations, as discussed in § 4.2.1 above. The bandwidth required to deliver the credit updates is quite big. Although it is assumed that each DQ can grow to at most 15 cells (as it takes what it needs from shared memory), each credit update (CRT) consumes 4 bits (where 4 bits can represent the up to 15 cells per DQ). Therefore up to 512 (=4×128) bits of credit updates may have to be delivered from 128 DQs to a SQ as soon as possible. If they are delivered over 26 cell time slots, 20 (=512/26) bits have to be transmitted in each cell time slot.

If the credit update (CRT) were to be sent in every time slot (and would therefore only need one bit per DQ to indicate whether or not a cell left the DQ) and one input link is associated with 128 queues, the CRT would consume 128 bits in the cell header. In addition to the CRT, the cell header may carry other information, some of which is described in the '733 provisional, such as the data cell overhead (33 bits), the PACK (30 bits), and the Header Error Detection and Correction (HEC) field (8 bits). If the CRT field is 128 bits, the cell header size should be at least 26 bytes (i.e., 208 bits). If the cell size is 64 bytes, the cell payload size becomes 38 bytes (and the overhead ratio is 41%). Unfortunately, however, a 38 byte payload size will not be acceptable in many applications because it cannot accommodate ATM cells which require at least 52 bytes.

If the receiver sends a CRT in every 26 time slots (i.e., divides the CRT over 26 cells in 26 time slots), the cell headers can afford to carry the constituent parts of the CRT. In one embodiment, each of the CRTs represents the number of cells in each of the DQs in a buffer associated with an input line. Since the number of DQs to be acknowledged by a link is the sum of 64 high-priority DQs and 64 low-priority DQs, the number of DQs to be acknowledged by a link is 128. Table 3 shows the CRT bandwidth per cell time slot, and therefore per cell header, with different credit update periods (CUPs). As shown in the first row of Table 3, if CUP=1 time slot, the CRT consumes 512 bits in the cell header, which is too large to be practical. (This assumes that the credit update refers to the number of cells remaining in the DQ. If, however, the credit update refers to the number of cells transmitted during the last credit update period, 128 bits are consumed.) As shown in the fourth row of Table 3, if CUP=26 time slots, and the DQ size is 15 cells (which corresponds to 4-bits per DQ), only 20 bits are used for the CRT.

TABLE 3

| CRT UPDATE PERIOD (CUP) | UPDATED DQ PER TS | BITS PER DQ | CRT BITS PER TS |
| --- | --- | --- | --- |
| 1 TS | 128 | 4 bit | 512 bit |
| 10 TS | 13 | 4 bit | 52 bit |
| 13 TS | 10 | 4 bit | 40 bit |
| 26 TS | 5 | 4 bit | 20 bit |

Thus, the bits of a CRT can be inserted into headers of a number of cells, instead of being provided as payload in a credit cell. Using the cell header to carry bits of the CRT is more efficient than using the payload of a credit cell because the credit update must be sent as frequent as possible. The SQ should not have to wait too long when the DQ can accept more cells.

§ 4.2.2.1 Implementation of the Per DQ Flow Control

Figure 5:
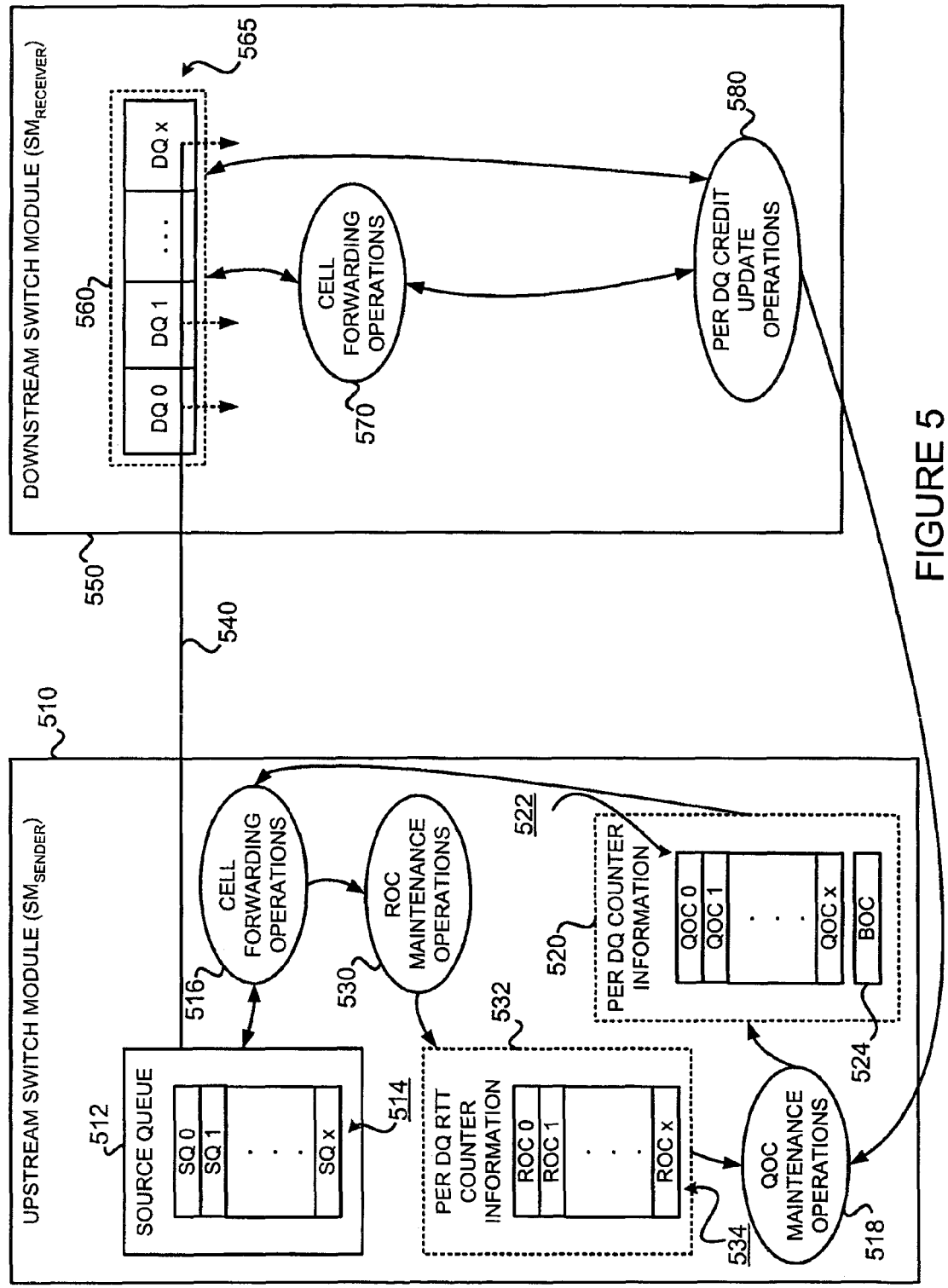
FIG. 5 illustrates an exemplary implementation of flow control between an SM sender and receiver, in a manner consistent with the present invention.

An exemplary implementation of a per DQ flow control scheme that is consistent with the present invention is illustrated in FIG. 5. To simplify the drawing, components corresponding to a single link 540 (and therefore a single source queue (SQ) 512 and a single output buffer 50) are shown. At an upstream switch module ($SM_{SENDER}$) 510, an SQ 512 may maintain DQ outstanding cell counters (QOCs) 522, each of which may be used to represent the sum of the cells left in a corresponding DQ 565 and any cells (that have left the SQ 512) on the link 540 destined for the DQ 565. If the distance between the two SMs 510,550 is far, the number of cells on the link 540 can be large. Each QOC 522 is updated according to the information provided about the corresponding DQ 565 provided from the downstream switch module ($SM_{RECEIVER}$) 550, as well as from a corresponding RTT Outstanding Cell counter (ROC) 534. The ROC is the number of cells transmitted to the DQ during the last RTT.

One simple way to update a QOC 522 is to have the $SM_{RECEIVER}$ 550 periodically send a credit update (CRT) corresponding to the DQ 565. This may be done by per DQ credit update operations 580. Two alternative CRT schemes are described below. Under the first scheme, it is determined how many cells were transmitted from the DQ 565 during the last credit update period (CUP). (See, e.g., the cell forwarding operations 570 communicating such information to the per DQ credit update operations 580.) This first scheme is vulnerable to CRT loss and cell loss. Once a cell or CRT is lost, it is difficult to resynchronize the QOC and the actual outstanding number of cells for the DQ 565. Under the second scheme, it is determined how many cells are left in the DQ 565. (See, e.g., the per DQ credit update operations receiving information from the DQs 565 of the buffer 560. The second scheme can tolerate cell or CRT loss, as will be illustrated below. The following description assumes that the second scheme is being used.

Regardless of the CRT scheme used, the $SM_{sender}$ 510 may maintain the QOCs 522. Whenever a cell is transmitted, cell forwarding operations 516 may inform ROC maintenance operations 530 and QOC maintenance operations 518. In response, ROC operations 530 may increment a count of an appropriate one of the ROCs 534. Thus, the ROC counts the number of cells transmitted during the RTT just before the CRT is received. The corresponding QOC 520 will be appropriately incremented using the QOC maintenance operations 518. Count increments can correspond to individual cells. QOC maintenance operations 518 update one of the QOCs 522. For example, it may do so whenever a credit is received. If the second scheme discussed above is used and the CRT represents a number of cells in each of one or more DQs, the QOC maintenance operations 518 may determine a QOC 522 of a particular DQ as the sum of the corresponding CRT and ROC 534. (If the first scheme discussed above is used, in which the CRT represents a number of cells that have left each of one or more DQs 565, the corresponding CRT would be subtracted from the QOC.)

The QOC maintenance operations 518 can also maintain a Buffer Outstanding Cell counter (BOC) 524 as the sum of QOCs 522 for a given buffer 560. In this way, for a shared-memory queue buffer having a memory size less than the product of the number of DQs and cells per DQ, the $SM_{sender}$ 510 can avoid overflowing a full buffer 560 when a given DQ 565 is not full.

As can be appreciated from the foregoing, the $SM_{receiver}$ periodically sends a credit update (CRT) to the $SM_{sender}$ to inform the sender of the number of cells in the DQ (in the second scheme, or the number of cells that have left the DQ in a given time period in the first scheme). Recall that the CRT may be divided over a number of cells and cell time slots. Then the BOC and QOC can be updated accordingly. When a CRT is received, the QOC may be updated as the sum of the CRT and ROC (i.e., QOC=CRT+ROC). At this time, the ROC may be reset to 0. The ROC is incremented only during a period of RTT window. For example, if CUP is 26 time slots, RTT is 8 time slots, and the CRT is received at time slot 26, the ROC is incremented between time slots 18 and 26. The ROC cannot be greater than RTT.

Figure 4:
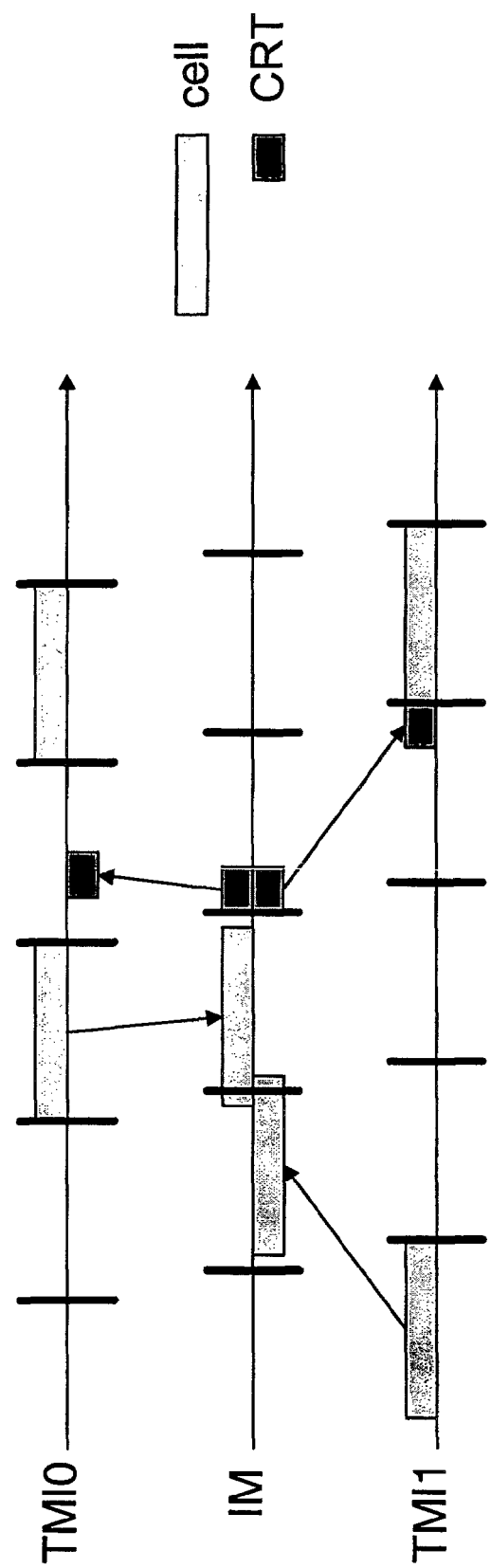
FIG. 4 illustrates the affect of timer misalignment of upstream modules on cells received at a downstream module.

Although FIG. 5 depicts CRT information flowing upstream from per DQ credit update operations 580 to QOC maintenance operations 518, such information may actually go from $SM_{receiver}$ 550 to $SM_{sender}$ 510 indirectly. (See, e.g., FIG. 4 of the '733 provisional.)

Figures 6A, 6B:
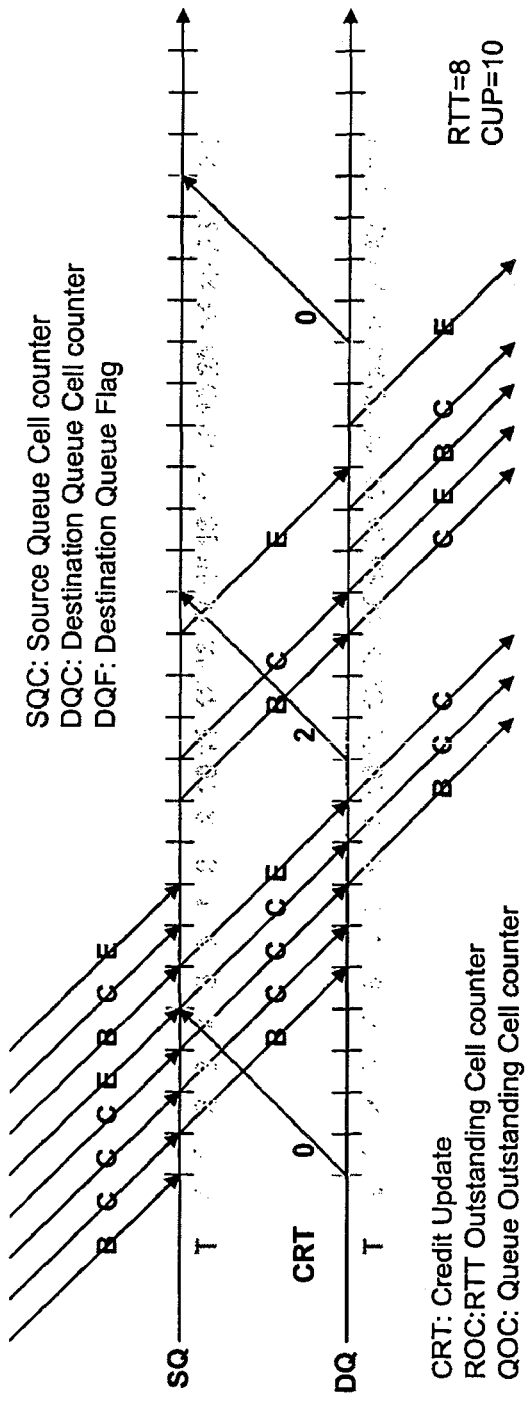
FIGS. 6A and 6B illustrate operations of an exemplary implementation of flow control under a normal case.

FIGS. 6a and 6b illustrate an example of updating a register. In this example, the RTT is 8, the CUP is 10, and the DQ size is 10. As shown in FIG. 6a, the SQ receives 8 cells from TS 0 through TS 7. The SQ sends 5 cells to the DQ from TS 2 through TS 6, 2 cells at TS 10 and TS 11, and 1 cell at TS 14. The DQ receives 5 cells from TS 6 through TS 10, 2 cells at TS 14 and TS 15, and 1 cell at TS19. The DQ sends 3 cells from TS 8 through TS 10, 4 cells from 14 to 17, and 1 cell at TS 19.

The table of FIG. 6b indicates various state values at various time slots (TS). The first row of the table of FIG. 6b shows the number of cells at the SQ (i.e., SQ counter (sQC)), the second row shows the number of cells at the DQ (i.e., DQ Counter (DQC)), the third row shows the state of a DQ flag (i.e., DQF indicates if the DQ is taken by other SQ, as described in the '733 provisional), the fourth row shows the CRT (which is what the DQC was four time slots ago), the fifth row shows the ROC and the sixth row shows the QOC. The CRT is sent from the DQ at TS 1, 11, 21 and is received at the SQ at TS 5, 15, 25. The ROC opens its gate (begins counting). The gate is open for eight (8) time slots in every credit update period. Therefore, the gate was open between time slots –3 and 5, which is why the table has ROC of 1 at TS 2. at TS 7 and closes at TS 15. During that period, 3 cells are sent from the SQ to the DQ. Therefore, the ROC is 3 at TS 15. The QOC is updated at TS 5, 15, and 25.

The hardware (e.g., ASIC), links, and connectors are not perfect and they can malfunction, break, or be cut. When a fault occurs, the system should be able to detect, isolate, and recover from the fault as soon as possible. In the following sections, credit loss, cell loss, and fiber cut are addressed. An example illustrating how a fault is detected and restored is provided. As will be shown below, this scheme is fault tolerant for credit loss, cell loss, or fiber cut.

§ 4.2.2.1.1 Credit Loss

Figures 7A, 7B:
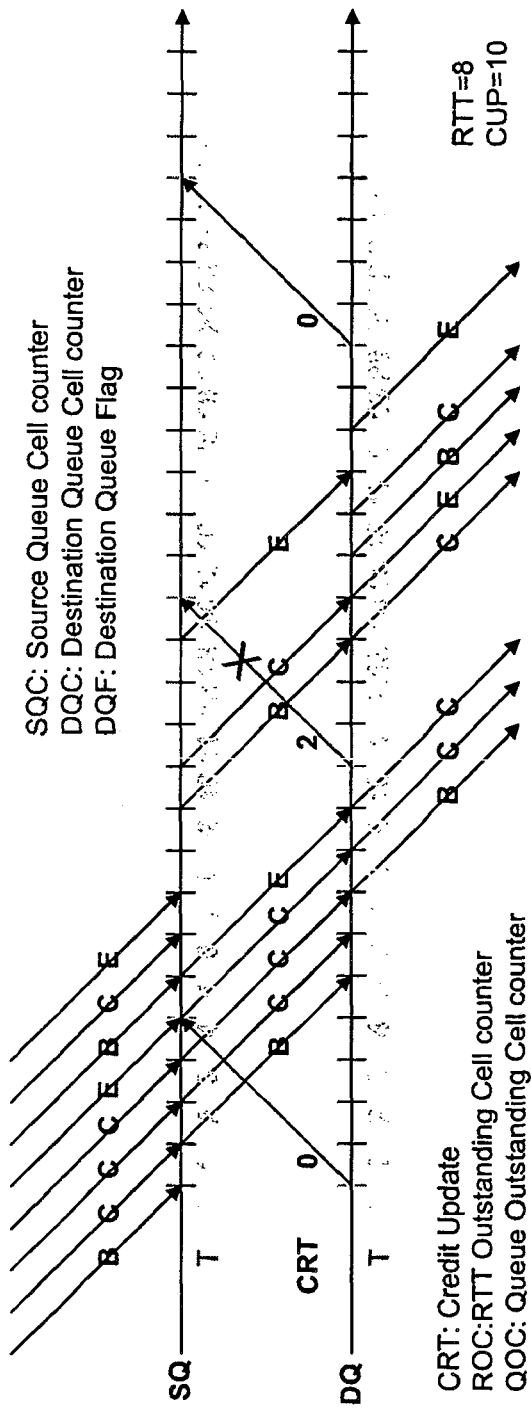
FIGS. 7A and 7B illustrate operations of an exemplary implementation of flow control under a credit loss case.

CRT loss can be easily recovered. Assuming that the downstream node sends a full CRT over 10 time slots, the upstream SM can synchronize with the downstream SM every 10 time slots. (Note that in this example, CUP is assumed 10 to simplify the Figures and Tables even though the CUP was assumed 26 in the previous description.) If one CRT is lost, the next CRT can be used to synchronize the two SMs. The impact of a CRT loss is that the upstream SM may not be eligible to send cells until a new CRT arrives, even though the SM receiver may have had enough free space in the interim. This is because the outstanding cell counters of the SM sender are not updated. However, this impact is minimal on the performance of the flow. For example, as shown in FIGS. 7a and 7b, the QOC remains at 8 in time slot 15 because the CRT is lost. But the QOC is recovered in time slot 25 when the next CRT arrives.

§ 4.2.2.1.2 Cell Loss

Figures 8A, 8B:
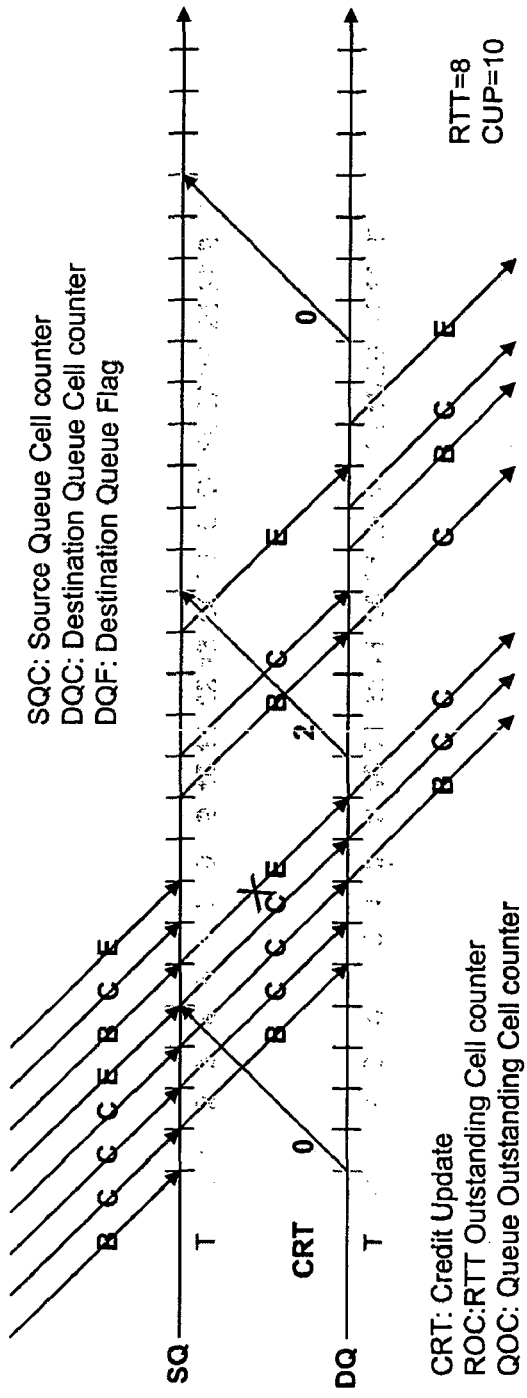
FIGS. 8A and 8B illustrate operations of an exemplary implementation of flow control under a one cell loss case.
Figures 9A, 9B:
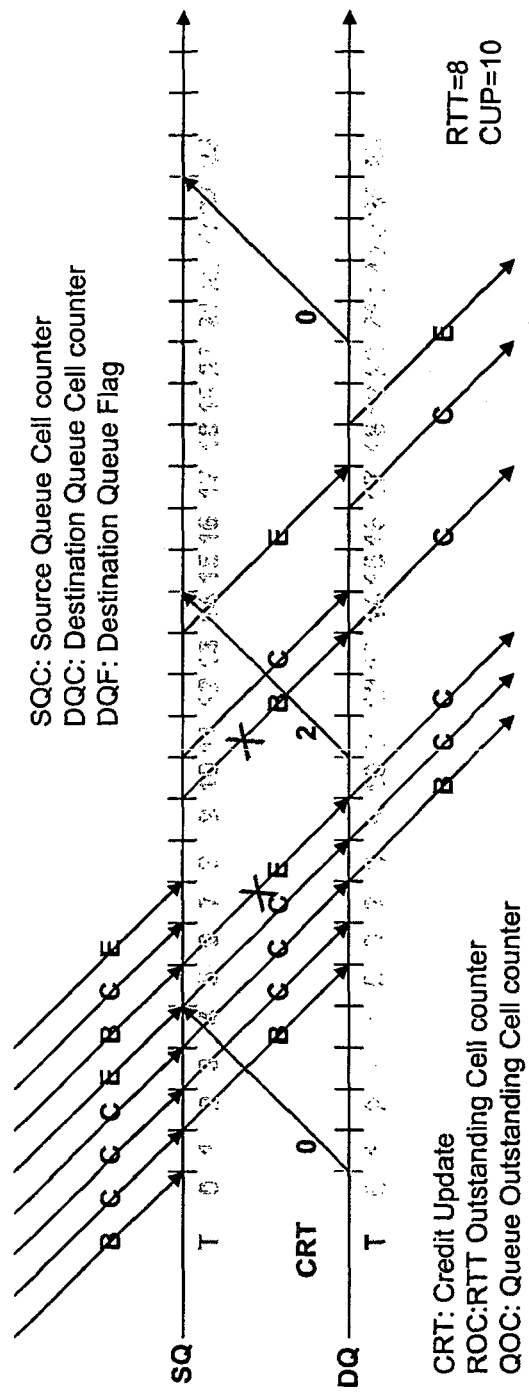
FIGS. 9A and 9B illustrate operations of an exemplary implementation of flow control under a two cell loss case.

A cell can be lost during a transmission. Although the receiving side of a link can detect a bit error (e.g., using HEC code) and discard such an erroneous cell, the receiving side cannot get information, such as the cell type (e.g., beginning of packet (BOP), continue of packet (COP), end of packet (EOP), single cell packet (SCP), etc.) or the DQ ID, from a lost cell. Fortunately, the cell type of a lost cell can be determined at the DQ by comparing the last cell and the next cell. FIGS. 8a and 8b illustrate this. In the example illustrated in FIGS. 8a and 8b, the fifth cell is lost during the transmission.

The DQ can detect the cell type of the lost cell (i.e., of the fifth cell) by comparing the last cell (i.e., the fourth cell) and the next cell (i.e., sixth cell).

Table 4 shows how the cell type of the lost cell can be determined from a last and next cell. The leftmost column in Table 4 is the cell type of the last cell. The top row is the cell type of the next cell. The lost cell is between the last cell and the next cell.

TABLE 4

| LAST\NEXT | BOP | COP | EOP | SCP |
|---|---|---|---|---|
| BOP | EOP | COP | COP | EOP |
| COP | EOP | COP | COP | EOP |
| EOP | SCP | BOP | BOP | SCP |
| SCP | SCP | BOP | BOP | SCP |

The loss of a COP cell may be undetectable at the IM, CM, and OM because the receiving side has no idea of the packet length, and therefore it has no idea of how many COP cells, if any, should be between a BOP cell and an EOP cell. The loss of an SCP cell may be undetectable in the switch because it is inserted between two packets. Thus, if a module receives an EOP cell then a BOP cell, it has no way of knowing whether a SCP cell was sent between the two and lost. The end user at the TCP layer may detect packet loss and the lost packet may be retransmitted. On the other hand the loss of an EOP cell or a BOP cell can be detected because the cell type of the next cell will be different from the expected cell type. If BOP cell loss is detected, the downstream node should discard all cells coming to the DQ until it sees the EOP cell. If EOP cell loss is detected, the DQ should create a dummy EOP cell and send it to the next stage so that the RPC and DQF (which are described in the '733 provisional) are correctly updated. The TME may reassemble the packet from the cells and check the packet length and the CRC of the packet. If either one of the two fields is not correct, the whole packet may be discarded at the TME. Therefore, the packet that lost a COP or EOP cell along the path may be discarded at the TME in this way.

In the case of two cells lost between the last cell and the next cell, the actions to be taken are similar to the case of one cell loss. Table 5 illustrates the detection of two cell loss. Table 1 Detection of two cell loss.

TABLE 5

| LAST\NEXT | BOP | COP | EOP | SCP |
|---|---|---|---|---|
| BOP | EOP & SCP<br>COP & EOP | COP & COP<br>EOP & BOP | COP & COP<br>EOP & BOP | EOP & SCP<br>COP & EOP |
| COP | EOP & SCP<br>COP & EOP | COP & COP<br>EOP & BOP | COP & COP<br>EOP & BOP | EOP & SCP<br>COP & EOP |
| EOP | BOP & EOP<br>SCP & SCP | BOP & COP<br>SCP & BOP | BOP & COP<br>SCP & BOP | BOP & EOP<br>SCP & SCP |
| SCP | BOP & EOP<br>SCP & SCP | BOP & COP<br>SCP & BOP | BOP & COP<br>SCP & BOP | BOP & EOP<br>SCP & SCP |

§ 4.2.2.1.3 Exemplary Methods

FIG. 10 is a flow diagram of an exemplary method 1000 that may be used to perform per link cell forwarding in a manner consistent with the present invention. (Recall, e.g., operations 516 of FIG. 5.) As indicated by phantom blocks 1010 and 1070, the main acts of the method 1000 may be performed for various SQs. For example, each SQ may be processed in a round-robin manner, or weighted round-robin manner, etc. In any event, an SQ is selected in some manner (block 1010) and the HOL cell in a queue corresponding to the SQ is accepted (block 1020). Then, it is determined whether or not to forward the cell using a corresponding DQ outstanding cell counter (QOC). Then, as indicated by decision block 1030, it may be determined whether or not the buffer outstanding cell count (BOC) exceeds a buffer threshold. If so, the method 1000 may wait (block 1040) and check the BOC again later (e.g., after a credit update period). If, on the other hand, BOC is less than a buffer threshold, the method 1000 continues to decision block 1050. As indicated by decision block 1050, it is determined whether or not the corresponding QOC is less than a predetermined threshold. If not, another SQ may be selected (block 1070) before the method 1000 continues at block 1020. If, on the other hand, it is determined to forward the HOL cell, the cell is sent over the link 1040 and the method 1000 continues to block 1070, already described.

FIG. 11 is a flow diagram of an exemplary method 1100 that may be used to maintain a per link destination queue outstanding cell count in a manner consistent with the present invention. (Recall, e.g., operations 518 of FIG. 5.) Cell count information for the DQ is accepted as indicated by block 1110. Similarly, cell-in-transit to the DQ is accepted as indicated by block 1120. Finally, the DQ count (QOC) is updated using the accepted cell count information and the accepted cell-in-transit information (block 1130) before the method 1100 is left (node 1140).

Figure 12A:
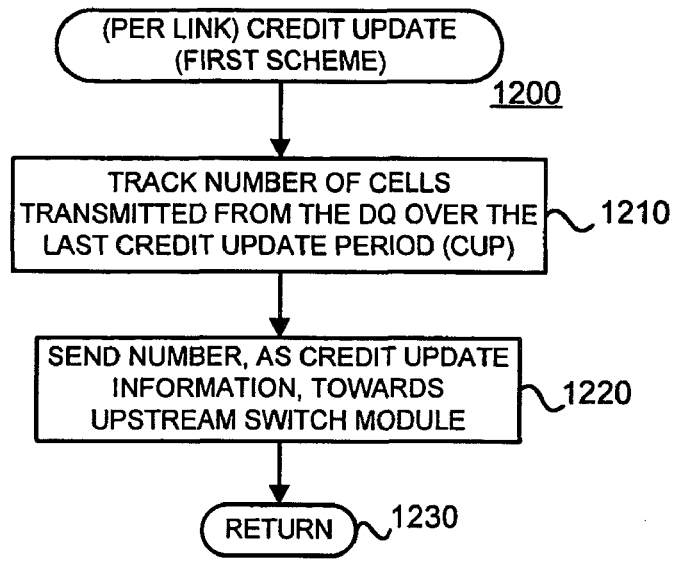
FIGS. 12A and 12B are flow diagrams of alternative exemplary methods that may be used to update, a per link, destination queue credit in a manner consistent with the present invention.
Figure 12B:
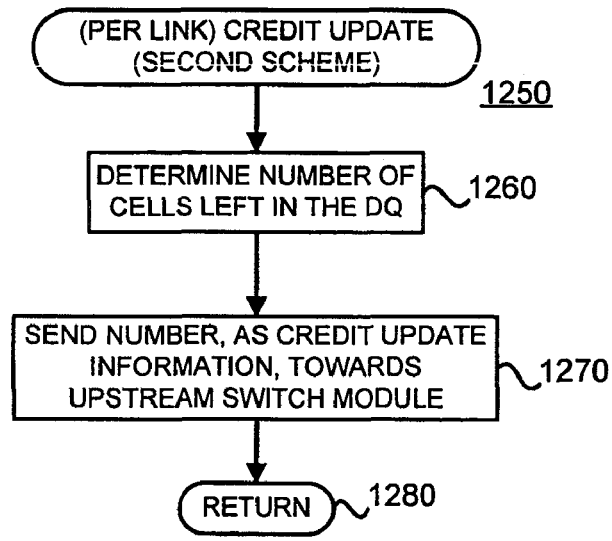

FIGS. 12A and 12B are flow diagrams of alternative exemplary methods 1200 and 1250, respectively, that may be used to update, a per link, DQ credit in a manner consistent with the present invention. (Recall, e.g., operations 580 of FIG. 5.) Referring first to the method 1200 of FIG. 12A, the number of cells transmitted from the DQ over the last credit update period (CUP) is tracked (Block 1210) and this information is sent (either directly, or more likely indirectly), as credit update information, to the upstream switch module (block 1220) before the method 1200 is left (node 1230). Recall that this scheme might fail if credit update information does not successfully reach the upstream switch module.

Referring now to the method 1240 of FIG. 12B, the number of cells left in the DQ is determined (Block 1260), and this information is sent (either directly, or more likely indirectly), as credit update information, to the upstream switch module (block 1270) before the method 1250 is left (node 1280).

Figure 13:
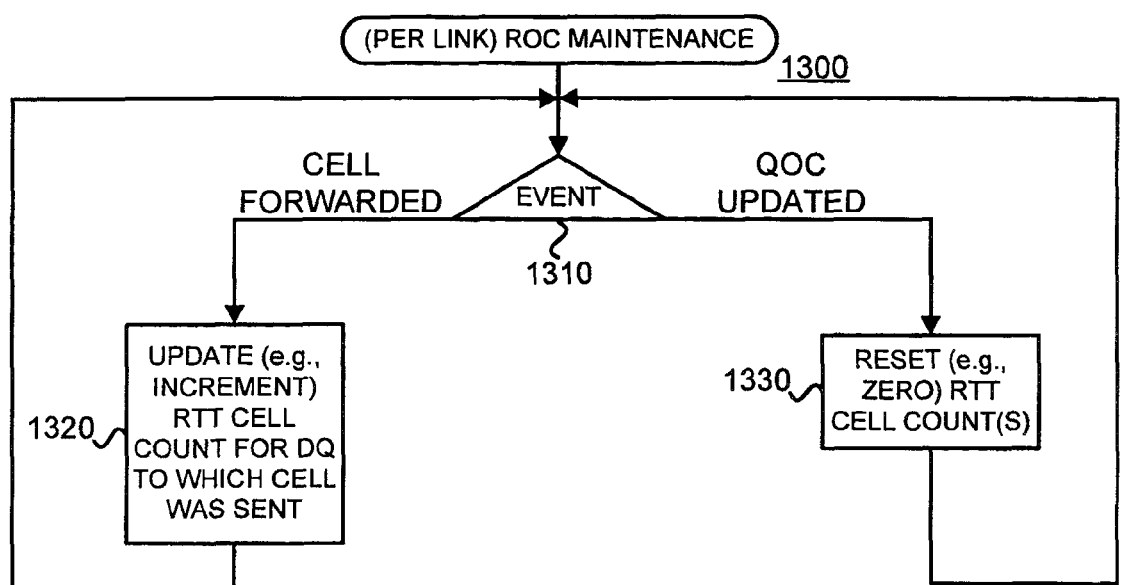
FIG. 13 is a flow diagram of an exemplary method that may be used to track a cell count corresponding to a round trip time delay in a manner consistent with the present invention.

FIG. 13 is a flow diagram of an exemplary method 1300 that may be used to track a number of cells transmitted to the DQ during the last RTT. This cell count may correspond to cells-in-transit over a round trip time delay in a manner consistent with the present invention. (Recall, e.g., operations 530 of FIG. 5.) Different branches of the method 1300 can be performed in response to the occurrence of different trigger events as indicated by block 1310. For example, if a cell (to be stored in a particular DQ) is forwarded over the link, an RTT cell count for the DQ is updated (e.g., incremented) (block 1320) before the method 1300 branches back to block 1310. If the outstanding cell count of the DQ is updated, the RTT cell count for the DQ is reset (e.g., zeroed) (block 1330) before the method 1300 branches back to block 1310.

§ 4.3 CONCLUSIONS

As can be appreciated from the foregoing, the present invention uses memory space effectively by allowing cell memory to be shared by an input link and all output links. One flow may be prevented from occupying the entire memory space by setting a threshold for the queue. The present invention also provides practical and robust flow control. For example, queue length information about a downstream switch module may be sent to an upstream switch module via cell headers in every credit update period per link. One embodiment of the present invention inherently recovers any cell and/or credit loss. Sending a credit per link simplifies implementation and eliminates interference between other links.

What is claimed is:

1. A method for controlling sending cells from a first device having at least one communications link with a second device, the second device being capable of maintaining, for each of the at least one communications links, a queue for each of a plurality of X destinations, the method comprising:
maintaining a cell count associated with each of the X destination queues of the second device;
wherein the act of maintaining a cell count associated with each of the X destination queues of the second device comprises, for each of the at least one communications links,
accepting credit update information originating from the second device;
accepting cell-in-transit information concerning a number of cells in transit from the first device to the second device; and
updating the cell count using the accepted credit update information and the accepted cell-in-transit information;
accepting a cell at the first device;
determining a destination of the cell; and
determining whether or not to forward the cell from the first device to the second device using the cell count associated with the one of the X destination queues of the second device corresponding to the determined destination of the cell.

2. The method of claim 1 wherein determining whether or not to forward the cell from the first device to the second device using the cell count associated with one of the X destination queues is performed for each of the at least one communications links independently.

3. The method of claim 1 wherein the credit update information includes information about a number of cells in each of the X destination queues of the second device associated with the at least one communications link.

4. The method of claim 1 wherein the credit update information includes a count of cells in each of the X destination queues of the second device associated with the at least one communications link.

5. The method of claim 1 wherein the cell-in-transit information is based on a round trip time delay between the first device and the second device.

6. The method of claim 1 wherein the act of maintaining a cell count associated with each of the X destination queues further comprises:
resetting cell-in-transit information concerning a number of cells in transit from the first device to the second device.

7. The method of claim 6 wherein the cell-in-transit information is reset after updating the cell count.

8. The method of claim 1 wherein the accepted credit update information originating from the second device is carried in a cell header.

9. The method of claim 1 wherein the accepted credit update information for all of the X destination queues is separated into parts, and wherein each of the parts of the accepted credit update information is carried in a cell header of each of a plurality of S cells, wherein S represents a number of cells in a group of cells used to carry the credit update information.

10. The method of claim 9, wherein each of the plurality of S cells carries about R-bits of credit update information, wherein the maximum cell count size of each of the destination queues can be expressed with Q-bits, and wherein $$R \geq \frac{QX}{S}.$$

11. The method of claim 9, wherein each of the plurality of S cells carries about R-bits of credit update information, wherein the maximum cell count size of each of the destination queues can be expressed with Q-bits, and wherein $$R = \frac{QX}{S}.$$

12. The method of claim 1 wherein the queues for the plurality of X destinations share a common buffer memory.

13. The method of claim 1 wherein the act of maintaining a cell count associated with each of the X destination queues of the second device includes, for each of the at least one communications links,
accepting per destination queue cell count information originating from the second device;
accepting per destination queue cell-in-transit from the first device to the second device count; and
updating a per destination queue cell count with a sum of (A) the per destination queue cell count and (B) the per destination queue cell-in-transit count.

14. The method of claim 13 wherein the credit update information includes information about a number of cells in each of the destination queues of the second device associated with the at least one communications link.

15. The method of claim 13 wherein the credit update information includes a count of cells in each of the destination queues of the second device associated with the at least one communications link.

16. The method of claim 13 wherein the cell-in-transmit information is based on a round trip time delay.

17. The method of claim 13 further comprising:
resetting cell-in-transit information concerning a number of cells in transit from the first device to the second device.

18. The method of claim 17 wherein the cell-in-transit information is reset after updating the cell.

19. The method of claim 13 wherein the accepted credit update information originating from the second device is carried in a cell header.

20. The method of claim 13 wherein the accepted credit update information for all of the destination queues is separated into parts, and wherein each of the parts of the accepted credit update information are carried in a cell header of each of a plurality of S cells, wherein S represents a number of cells in a group of cells used to carry the credit update information.

21. The method of claim 20, wherein each of the plurality of S cells carries about R-bits of credit update information, wherein the maximum cell count size of each of the destination queues can be expressed with Q-bits, and wherein $$R \geq \frac{QX}{S}.$$

22. The method of claim 20, wherein each of the plurality of S cells carries about R-bits of credit update information, wherein the maximum cell count size of each of the destination queues can be expressed with Q-bits, and wherein $$R = \frac{QX}{S}.$$

23. The method of claim 1 wherein the first device is an upstream switch module and the second device is a downstream switch module.

24. Apparatus for controlling sending cells from a first device having at least one communications link with a second device, the second device being capable of maintaining, for each of the at least one communications links, a queue for each of a plurality of X destinations, the apparatus comprising:
  means for maintaining a cell count associated with each of the X destination queues of the second device;
    wherein the means for maintaining a cell count associated with each of the X destination queues of the second device include, for each of the at least one communications links,
      means for accepting credit update information originating from the second device;
      means for accepting cell-in-transit information concerning a number of cells in transit from the first device to the second device; and
      means for updating the cell count using the accepted credit update information and the accepted cell-in-transit information;
  means for accepting a cell at the first device;
  means for determining a destination of the cell; and
  means for determining whether or not to forward the cell from the first device to the second device using the cell count associated with the one of the X destination queues of the second device corresponding to the determined destination of the cell.

25. The apparatus of claim 24 wherein the credit update information includes information about a number of cells in each of the X destination queues of the second device associated with the at least one communications link.

26. The apparatus of claim 24 wherein the credit update information includes a count of cells in each of the X destination queues of the second device associated with the at least one communications link.

27. The apparatus of claim 24 wherein the cell-in-transit information is based on a round trip time delay between the first device and the second device.

28. The apparatus of claim 24 further comprising:
  means for resetting cell-in-transit information concerning a number of cells in transit from the first device to the second device.

29. The apparatus of claim 28 wherein the means for resetting reset cell-in-transit information after the cell count has been updated.

30. The apparatus of claim 24 wherein the accepted credit update information originating from the second device is carried in a cell header.

31. The apparatus of claim 24 wherein the accepted credit update information for all of the destination queues is separated into parts, and wherein each of the parts of the accepted credit update information is carried in a cell header of each of a plurality of S cells, wherein S represents a number of cells in a group of cells used to carry the credit update information.

32. The apparatus of claim 31, wherein each of the plurality of S cells carries about R-bits of credit update information, wherein the maximum cell count size of each of the destination queues can be expressed with Q-bits, and wherein $$R \geq \frac{QX}{S}.$$

33. The apparatus of claim 31, wherein each of the plurality of S cells carries about R-bits of credit update information, wherein the maximum cell count size of each of the destination queues can be expressed with Q-bits, and wherein $$R = \frac{QX}{S}.$$

34. The apparatus of claim 24 wherein the queues for the plurality of X destinations share a common buffer memory.

35. The apparatus of claim 24 wherein the means for maintaining a cell count associated with each of the X destination queues of the second device includes, for each of the at least one communications links,
  means for accepting per destination queue cell count information originating from the second device;
  means for accepting per destination queue cell-in-transit from the first device to the second device count; and
  means for updating a per destination queue cell count with a sum of (A) the per destination queue cell count and (B) the per destination queue cell-in-transit count.

36. The apparatus of claim 35 wherein the credit update information includes information about a number of cells in each of the destination queues of the second device associated with the at least one communications link.

37. The apparatus of claim 35 wherein the credit update information includes a count of cells in each of the destination queues of the second device associated with the at least one communications link.

38. The apparatus of claim 35 wherein the cell-in-transit information is based on a round trip time delay.

39. The apparatus of claim 35 further comprising:
  means for resetting cell-in-transit information concerning a number of cells in transit from the first device to the second device.

40. The apparatus of claim 39 wherein means for resetting reset the cell-in-transit information after the cell count has been updated.

41. The apparatus of claim 35 wherein the accepted credit update information originating from the second device is carried in a cell header.

42. The apparatus of claim 35 wherein the accepted credit update information for all of the destination queues is separated into parts, and wherein each of the parts of the accepted credit update information is carried in a cell header of each of a plurality of S cells, wherein S represents a number of cells in a group of cells used to carry the credit update information.

43. The apparatus of claim 42, wherein each of the plurality of S cells carries about R-bits of credit update information, wherein the maximum cell count size of each of the destination queues can be expressed with Q-bits, and wherein

44. The apparatus of claim 42, wherein each of the plurality of S cells carries about R-bits of credit update information, wherein the maximum cell count size of each of the destination queues can be expressed with Q-bits, and wherein $$R \geq \frac{QX}{S}.$$

45. The apparatus of claim 24 wherein the first device is an upstream switch module and the second device is a downstream switch module.

$$R = \frac{QX}{S}.$$

* * * * *